(12) United States Patent
Sumner

(10) Patent No.: US 10,260,666 B2
(45) Date of Patent: Apr. 16, 2019

(54) SUBMARINE OR BURIED PIPING AND PIPELINES INSULATED WITH LIQUIDS

(71) Applicants: Glen R. Sumner, Houston, TX (US); ABCO SUBSEA, INC., Houston, TX (US)

(72) Inventor: Glen R. Sumner, Houston, TX (US)

(*) Notice: Subject to any disclaimer, the term of this patent is extended or adjusted under 35 U.S.C. 154(b) by 30 days.

(21) Appl. No.: 15/309,367

(22) PCT Filed: May 7, 2015

(86) PCT No.: PCT/US2015/029702
§ 371 (c)(1),
(2) Date: Nov. 7, 2016

(87) PCT Pub. No.: WO2015/171902
PCT Pub. Date: Nov. 12, 2015

(65) Prior Publication Data
US 2017/0074446 A1    Mar. 16, 2017

Related U.S. Application Data

(60) Provisional application No. 61/989,864, filed on May 7, 2014.

(51) Int. Cl.
*F16L 9/18* (2006.01)
*F16L 53/37* (2018.01)
(Continued)

(52) U.S. Cl.
CPC ............ *F16L 53/37* (2018.01); *E21B 36/003* (2013.01); *F16L 9/18* (2013.01); *F16L 53/32* (2018.01);
(Continued)

(58) Field of Classification Search
CPC ......... F16L 59/07; F16L 59/04; F16L 59/024; F16L 59/143
(Continued)

(56) References Cited

U.S. PATENT DOCUMENTS 3,794,358 A    2/1974  Allen et al.
4,116,009 A *  9/1978  Daubin ................ F03G 7/05
                                                114/264
(Continued)

FOREIGN PATENT DOCUMENTS

JP    S60 151493 A    8/1985
SU       777319 A1   11/1980

OTHER PUBLICATIONS

Int'l Search Report and Written Opinion in counterpart PCT Appl. PCT/US15/29702, dated Jul. 27, 2015, 6-pgs.
(Continued)

*Primary Examiner* — Patrick F Brinson
(74) *Attorney, Agent, or Firm* — Blank Rome LLP

(57) ABSTRACT

A fluid conduit that is below grade or under water is separated from ambient water by a confined layer of liquid that may be largely undivided by solids. The separation distance between the liquid containment means and the piping or pipeline is such that the total heat transfer by natural convection and conduction from the piping or pipeline to the water containing environment is kept within limits thought necessary to adequately insulate the contents of the pipeline. A liquid may be pumped between the pipe and the means for containing the insulation so as to displace fluids from a pipeline or a heated liquid may be pumped through that space to warm the contents of the pipeline. If the insulating liquid also electrically insulates the pipe, then the pipe may be heated by passing a current directly through the pipe.

20 Claims, 16 Drawing Sheets

(51) Int. Cl.
*E21B 36/00* (2006.01)
*F16L 59/14* (2006.01)
*F16L 59/20* (2006.01)
*F16L 53/32* (2018.01)
*F16L 53/35* (2018.01)

(52) U.S. Cl.
CPC ............. *F16L 53/35* (2018.01); *F16L 59/143* (2013.01); *F16L 59/20* (2013.01)

(58) Field of Classification Search
USPC ........................................ 138/114, 148, 149
See application file for complete search history.

(56) References Cited

U.S. PATENT DOCUMENTS

| | | | |
|---|---|---|---|
| 4,466,484 A | 8/1984 | Kermabon | |
| 4,550,771 A * | 11/1985 | Arbabian | F24D 11/005 126/643 |
| 5,862,866 A * | 1/1999 | Springer | E21B 17/00 166/380 |
| 6,116,290 A | 9/2000 | Ohrn | |
| 6,513,551 B2 * | 2/2003 | Louis | F16L 9/18 138/108 |
| 6,926,040 B1 * | 8/2005 | Prescott | F16L 59/143 138/113 |
| 7,234,492 B2 * | 6/2007 | Bastard | F16L 9/18 138/112 |
| 8,127,801 B2 * | 3/2012 | Brower | F16L 59/141 138/109 |
| 2006/0153337 A1 | 7/2006 | Holland et al. | |
| 2006/0169210 A1 | 8/2006 | Inagawa et al. | |

OTHER PUBLICATIONS

European Supplement Search Report and Written Opinion in counterpart EP Appl.15 78 8965, dated Jan. 8, 2018, 7-pgs.

* cited by examiner

SUBMARINE OR BURIED PIPING AND PIPELINES INSULATED WITH LIQUIDS

BACKGROUND

A. Field of the Disclosure

The subject matter of the present disclosure relates to thermally-insulated fluid conduits exposed to natural ground water or seawater at greater than atmospheric pressure.

B. Related Art

The need to insulate buried or submarine fluid conduits arises from temperature dependent impediments to flow including high viscosity, precipitated paraffin, freezing (e.g., natural gas hydrates, sulfur), or vaporization of cold liquids. The temperature above which many of the problems occur changes with pressure and can in some cases be altered by injecting chemicals into the fluid stream of the flow. Insulating fluid conduits can also be used any time arrival temperature is important, for example, when transporting steam or when the liquid would otherwise need to be reheated for processing.

Offshore exploration for hydrocarbon reserves continues to move into deeper waters where the ambient temperature is low and the fluid pressure is high. These conditions increase the viscosity of the carried fluids and increase the chances that natural gas hydrates will form or paraffin will precipitate on the inside wall of the conduit. For these reasons, insulation is often used on submarine pipelines that carry viscous liquids or transport liquefied gas between LNG tankers and onshore terminals, on flow lines that transport oil between submerged wellheads and offshore platforms and the wellheads, and on piping associated with these pipelines and flow lines. Insulating the fluid conduit can ensure that the carried fluids reach their destination without exceeding a temperature at which the resulting problems are serious enough to justify the cost to insulate the pipeline or piping. This temperature, whether precisely quantifiable or not, may be referred to herein as the "acute temperature."

Conventional insulating materials typically used at or near atmospheric pressure rely on the low thermal conductivity of gases (compared to liquids and solids). To mitigate thermal convection the gaseous volume is divided into minute spaces in porous solids or between finely divided solids, such as mineral wool or particulate matter. This reduces the so-called "characteristic length", an important parameter in the physics of convection. Any convection that remains is normally only considered as it appears in the "effective thermal conductivity," a value that is deduced using an artificial assumption that all heat transfer is by conduction. Aerogels are microporous solids that are so finely divided that they are mostly gas, and the dimension of the pours are on the order of the mean free path of the gas. By a phenomenon known as the Knudsen effect, the thermal conductivity of these microporous solids is less than the thermal conductivity of the confined gas. More recent studies have shown that the Knudsen effect also appears in finely divided solids filled with liquids.

Dense liquids usually fill the annuli between the tubing and casing or between casing layers in wells that produce liquids and gases from geological formations. The primary purpose of these dense liquids is to keep bottom-hole pressure in the annulus higher than the pressure of the reservoir so that produced fluids will rise through the tubing and not the annuli. In recent years, some fluids have been developed for the secondary purpose of enhancing properties that thermally insulate the production tubing. This has been done with fluids that gel at elevated temperature to eliminate convection (See e.g., U.S. Pat. Nos. 3,642,624 and 3,831,678, 8,236,736). More recently other fluids used for this purpose remain liquid but rely on increased viscosity to mitigate convection (See e.g., U.S. Pat. Nos. 3,618,680; 4,877,542; 8,186,436; 5,707,939; 5,712,228; 7,863,223 and US Pat. Pub. 2004/0087448; 2012/0208728). Insulating concrete has also been proposed for cementing casing (U.S. Pat. No. 4,822,422). Double wall tubing with an evacuated annulus is sometimes used to better insulate the production tubing (see http://www.offshore-mag.com/articles/print/volume-61/issue-2/news/flow-assurance-vacuum-insulated-tubing-helps-solve-deepwater-production-problems.html)

Piping and pipelines that operate at atmospheric pressure are usually insulated with conventional insulating materials as described above, but fluid conduits that are installed below grade or below sea level present special problems. Conventional polymer foams are sometimes covered in a flexible, waterproof plastic outer jacket or cover, but the depth at which this can be used is limited by the external hydrostatic pressure at which the porous insulation composite will collapse. Pipelines insulated in this manner have been plagued by leaks at the field joints or by punctures in the outer jacket.

In deeper water, offshore pipelines are sometimes insulated by installing conventional cellular foam or aerogel in the annulus between the fluid conduit and a coaxial outer pipe or casing that resists collapsing under seawater pressure (see U.S. Pat. No. 6,142,707). The French company ITP Interpipe SA offers encased aerogel or "microporous solid" insulation in a partially evacuated annulus. (See U.S. Pat. No. 6,145,547; French Pat. No. 2,746,891). This reduced gas pressure further reduces the effective thermal conductivity.

The deeper the ambient water head, the thicker the casing must be to resist collapse, making it heavier and requiring more time to weld together. If the pipes are spooled, the welding is done onshore. This cost can be less than welding on the lay barge, but the larger of these encased pipelines are too stiff to spool. In very deep water, where the suspended length in the lay process is long and the casing is thick, the collapse-resistant casing can make the pipeline so heavy as to be economically infeasible to install with any existing equipment. An attempt to reduce the wall thickness and the weight of the outer casing by pressurizing the annulus of an insulated flow line was thwarted in one project by an unanticipated large increase in the overall heat transfer coefficient. This was largely a result of increases in convective heat flow in the pores of the insulating composition (see https://www.onepetro.org/conference-paper/OTC-13074-MS).

Waterproof, collapse-resistant insulating materials that can be used underwater without a collapse-resistant, waterproof jacket are known in the prior art for insulating submerged piping and pipelines. Such materials avoid the costs and weight associated with using and welding the steel outer casing. These materials are hereinafter referred to as "wet insulation" or "wet insulating materials." The International Standards Organization is developing a standard entitled "Wet Thermal Insulating Coatings for Pipelines, Flow lines, Equipment and Subsea Structures"" (ISO/DIS 12736). The materials that have been used include rubber, polyurethane, elastomeric silicone, polypropylene, bitumen (See e.g., U.S. Pat. Nos. 6,182,705; 6,155,305; 5,871,034; and 6,092,557), polystyrene, and hydraulic cement (See U.S. Pat. No. 5,476,343).

In order to reduce the thermal conductivity, these wet insulating materials are sometimes extended with tiny air bubbles (in high density polymer foam), cork (in ebonite), closed cell fillers, or collapse-resistant spheres. In bituminous compositions, it has been proposed that such cellular fillers can help physically stabilize the bitumen at elevated temperatures (See U.S. Pat. No. 6,155,305). The savings in cost associated with casing pipes and welding afforded by wet insulation is weighed against the higher thermal conductivity (4 to 5 times) and higher cost per unit volume compared to conventional insulation. Despite these disadvantages, such materials can be cost-effective where moderate thermal resistance (the reciprocal of heat transfer coefficient) is needed, or where the water is so deep that the weight of encased insulation makes pipe installation infeasible.

Adhering wet insulating materials reliably to adjacent materials has been a technical challenge in practice. Wet insulation is pre-applied to the individual pipe joints, leaving a few inches of bare pipe at each end to allow field welding of the pipes together before the field joint insulation is applied. Pipelines have failed as a result of water ingress thorough interface of the insulation with the adjacent factory applied insulation. A consensus has emerged among the leading companies in the business of offshore hydrocarbon exploration and production that wet insulation must bond to adjacent materials so as to exclude water from the interfaces. If the pipes are joined on the pipe lay vessel, the time spent applying the field joint insulation that exceeds the time needed to weld the pipes is very costly.

Some of the preferred wet insulating materials, especially polypropylene, are notoriously antagonistic to adhesives. Bonding is more difficult at the axial interface of field joints because this bond is subject to long term cyclic thermal stresses that can vary with radius. In theory, hot fusing thermoplastics can create a seamless, cohesive bond, but in practice this is made difficult by the high coefficient of thermal expansion and low conductivity of the materials. Preheating of factory applied insulation takes time, and shrinkage upon cooling causes the materials to separate at the interface unless pressure is maintained on the field joint material until the bond solidifies. That makes cohesive bonding a costly approach when the pipeline is strung offshore, especially thick insulation. A unique difficulty of using bituminous materials is that the bond strength quickly diminishes when the bitumen softens at elevated temperature. Wet insulation that withstands higher temperatures is needed for hotter and deeper wells now being drilled. Unless a new approach is introduced they will cost even more than wet insulation of the prior art.

Insulating pipelines with materials that change from a solid to a liquid as the pipeline warms (phase change materials) is known in the prior art. (See U.S. Pat. No. 6,116,290). The essence of this technique is not the use of the phase change material in the liquid phase as insulation, but rather that the latent heat of melting is added to the heat that passes through separate insulation that surrounds it. This extends the time window for injecting hydrate or wax inhibiting chemicals that will enable a cold start of flow lines that carry hydrocarbons. The corollary of that benefit is that more heat is absorbed by the phase change material once the line is started, thereby possibly requiring injection of more hydrate or wax inhibiting chemicals.

Electrically insulating liquids have been contained in the annulus between a submerged pipe and a high voltage power transmission conductor to electrically insulate the conductor from seawater. In general, the acute temperature limits the length of a pipeline unless heat is added, because the longer the line the more heat is lost. This in turn limits the geographic area that can be served by a single offshore production platform receiving produced hydrocarbons from satellite wells on the sea bed.

Direct heating is a technique in which pipe is heated by passing enough electrical current through it to create resistance heating in the pipe itself. Where alternating current is used, the method is also known as "impedance" heating (See Epstein, Fred S. and White, Gary L., Understanding Impedance Heating, Chemical Engineering, pp. 112-118, May 1996). This has been proposed for use on pipelines with encased insulation when the line pipe is electrically insulated from an electrically conductive casing. Some waterproof insulating materials of the prior art (rubber and polypropylene) are also good waterproof electrical insulators so no additional tasks are added to the pipe laying process. This makes it conceptually ideal for heating offshore pipelines.

Because the electrical resistivity of steel is so much lower than seawater, direct heating can and has been used to heat pipelines that are protected with anodes (Lervik, Jens Kristian et al, Direct Electrical Heating of Subsea Pipelines, Proceedings of the Third (1993) International Offshore and Polar Engineering Conference, Jun. 6-11, 1993, vol. II, pp. 176-184; Ahlen, C. H., Electric Heat Tracing of Submarine Pipelines Induction Heating by the Statoil Invented "ITTI"—System, Proceedings of the First (1991) International Offshore and Polar Engineering Conference, Aug. 11-16, 1991, vol. II, pp. 331-334). This method is limited to warming the pipeline from a cold start because the cost of generating enough heat to warm the pipe and make up for the current lost through anodes makes continuous long term heating economically uncompetitive with encased insulation.

Doing away with the anodes on pipelines with wet insulation has been proposed (see U.S. Pat. No. 6,049,657) but even a small current leak at a field joint could be catastrophic. No wet insulation system of the prior art has yet inspired enough confidence to take that chance, partly because conventional insulating materials reduce heat flow so much better than wet insulating materials that in most real situations the applied cost of the popular wet insulation materials plus the present value of future heat generating costs would be more expensive than investing in more costly, but far more effective encased insulation and paying less to replace lost heat.

So-called "active heating" of pipelines by pumping a heated liquid though an annulus between a production pipe and an insulated casing has been used to warm offshore pipelines in the prior art long enough to enable "cold starts" (see http://e-book.lib.sjtu.edu.cn/otc-03/pdffiles/papers/otc15188.pdf). In a variation on this theme, it has been proposed to pump a heated liquid through a tube that runs through an insulated annulus (see U.S. Pat. No. 6,955,221)

The subject matter of the present disclosure is directed to either reducing the cost to insulate fluid conduits in high ambient pressure, or overcoming or at least reducing one or more of the problems set forth above.

SUMMARY OF THE DISCLOSURE

In the present disclosure, all or part of a fluid conduit that is below grade or under water is separated from ambient water by a confined liquid or superheated fluid, herein after referred to as "liquid insulation," "insulating liquid," or just "liquid." Superheated fluids have many of the properties of liquids, but have very low thermal conductivity and transport characteristics of gases. For the purpose of this disclosure, any references to liquids used as insulation will include superheated fluids to the extent this can apply.

The overall space or annulus in which the liquid insulation is contained may be wholly or largely undivided by solids or maybe contained in finely divided or "microporous" solids, where the term "microporous" means the pour size is such that the thermal conductivity of the insulating liquid is lower than its thermal conductivity in larger divisions. In some cases simply dividing the containment space into a few parts may reduce convective heat transfer to small fraction of the conductive heat transfer. The separation distance between the liquid containment means and the fluid conduit, and the number of divisions within that space is such that the total heat transfer by natural convection and conduction from the piping or pipeline to the water containing environment is kept within design limits to insulate the contents.

A liquid insulation may be pumped between the fluid conduit and the means for containing the insulation so as to displace the content of a fluid conduit, or a heated liquid may be pumped through that space to warm the contents of the fluid conduit. If the insulating liquid also electrically insulates the fluid conduit, then the fluid conduit may be heated by passing a current directly through the fluid conduit.

The foregoing summary is not intended to summarize each potential embodiment or every aspect of the present disclosure.

DETAILED DESCRIPTION

A. Pipeline with Liquid Insulation

Figure 1:
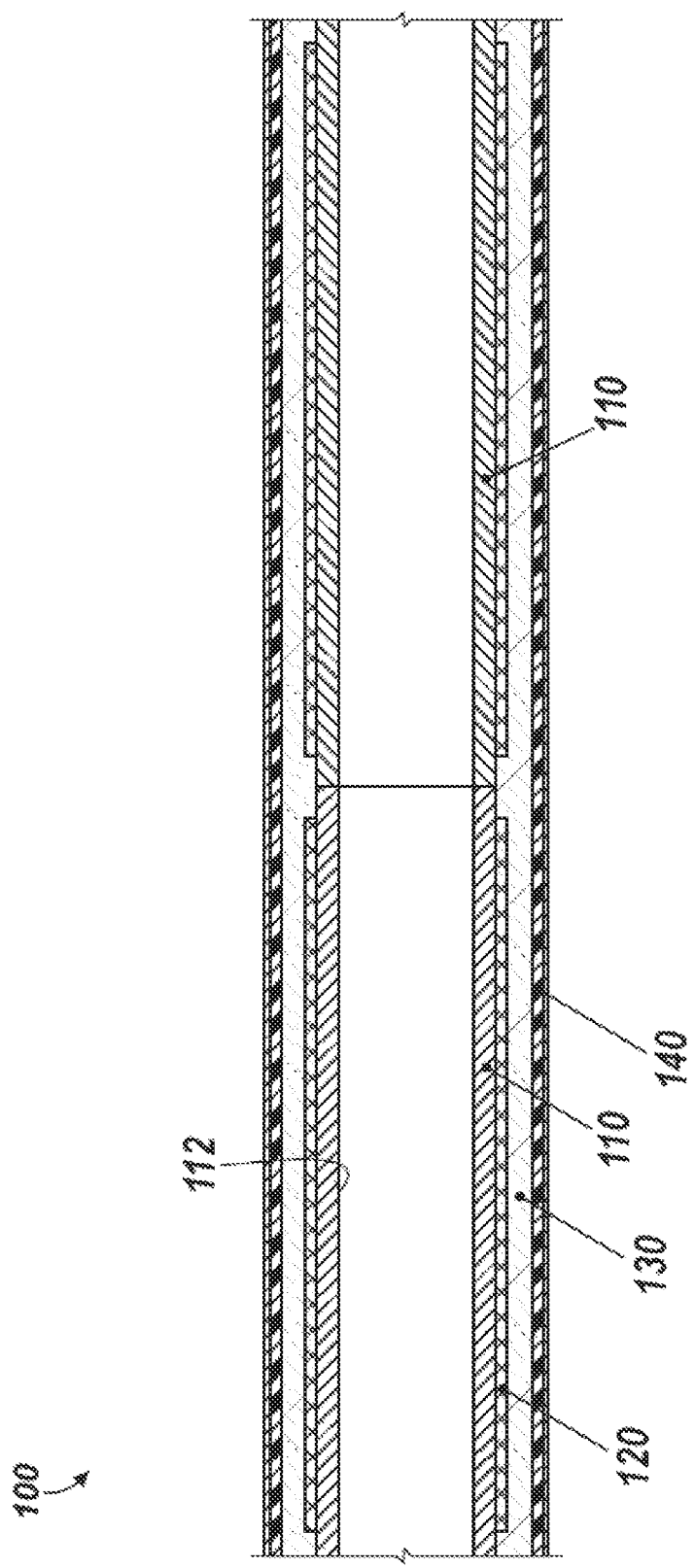
FIG. 1 shows a fluid conductor having liquid insulation according to the present disclosure.

FIG. 1 illustrates an insulated fluid conductor (100) according to the present disclosure. This fluid conductor (100) includes one or more one fluid conduits (110) surrounded by liquid insulation (130) in a container (140). The fluid conduit (110) can be line pipe, casing pipe, pressure pipe, a flow line, pipeline, riser, valve, choke, blowout preventer or the like. In general, the conduits (110) can be composed of any suitable material. Conventional insulation (120) may also be included. The container (140) can be an inflexible, collapse resistant casing or it can be made of a flexible material so that collapse under high than atmospheric ambient pressure is at least partially resisted by the liquid insulation (130). The containment means is used primarily to contain the liquid insulation (130) and resist impact and damage during installation and use, but as is illustrated in other figures, these two functions can be served by two different parts, for example a more or less rigid casing and a membrane such as a bladder that transmits ambient pressure into the liquid insulation.

As its name implies, the liquid insulation (130) thermally insulates the flow in the bore (112) of the conduits (110) from the environment which may be at higher than atmospheric pressure.

B. Disadvantage of Liquid Insulation

As insulating materials, liquids share well-known disadvantages associated with both gases (convective heat flow and need for containment) and solids (higher conductivity than gases). To the extent that natural fluid convection has been a known factor in reducing the performance of submarine piping and pipeline insulation of the prior art, it has always been in gases, usually finely divided in small cells or bubbles in the insulating material.

C. Advantage of Liquid Insulation

Despite their well-known disadvantages, liquids have peculiar benefits for insulating buried or submarine conduits that have been overlooked until now and are not readily apparent to those skilled in the art of constructing or using buried or submarine pipelines or piping.

The majority of buried or submarine pipes and pipelines are associated with oil and gas production. Thus, while the construction companies may work in more than one industry, the pipeline specialists are usually familiar with that large market. However, oil and gas production is just one segment of the oil and gas industry, which is a vertical integration of industries that deal with petroleum products. The largest divisions are the "upstream" (exploration and production), "midstream" (transportation and distribution), and "downstream" (petrochemical and refining) segments. Even the companies that operate in more than one segment usually conduct business in each segment from separate corporate divisions.

As is evident in the names, these broad industry segments are further subdivided. Offshore flow lines and wellhead equipment fall into the production side of exploration and production, whereas larger pipelines fall into the transportation side of transportation and distribution. The business of drilling wells falls into the exploration side of exploration and production, and that is further divided into offshore and offshore drilling. Drilling fluids form a significant business line in themselves within the exploration segment, and have little application in other segments. Wellhead equipment functions in both exploration and production, but the expertise resides with people skilled in the art of heavy manufacturing, while those who design and install pipelines and submarine piping are skilled in the art of engineering and construction. Those who drill wells are skilled in the particular art of drilling.

The markets associated with these segments are so distinct from one another that many companies that serve one segment do not venture into similar markets on other segments. For example, the major companies that apply coatings to the inside of drill pipes are different from (and generally do not compete with) the companies that apply anti-corrosion coatings to the outside of line pipe. Similarly, the companies that make vacuum insulated tubing have rarely if ever sold it for insulating flow lines, yet a totally unrelated company (ITP Interpipe SA) was able to exploit a patent on line pipe insulated with conventional insulation in a partially evacuated annulus.

The products of insulating pipe for flow lines and pipelines evolved from the business of applying anti-corrosion coatings because the customers were the same for both businesses. Therefore, companies that apply external anti-corrosion coatings were well positioned to insulate pipe when the need arose because they presumably know how to put solid materials on pipe in high volume production. The external coating companies see their function as "applicators," not as coating material manufacturers, chemists, or oilfield design engineers. A similar rational applies to those in the business of making wellhead equipment, while the companies making drilling fluids are focused on filling a primary need in their market that does not exist in the pipeline business.

Oil and gas companies have the fewest employees per dollar in revenue of any major industry, and generally have much lower research and development budgets too. They see their business as producing and refining hydrocarbons and energy production, not insulating pipe or development of related products. Instead, they pick products from those offered by vendors and contractors who they see as experts in their field, and who can deliver and stand behind products and services. They are very risk averse due to the huge amounts of capital at stake. Nothing is obvious until it is seen to have undergone extensive testing or prior use, and this same attitude applies to the contractors they use. This posture is, therefore adopted by the contractors that design oil fields and install pipelines. The properties that affect heat transfer in fluids that are most sensitive to pressure are thermal conductivity density and viscosity. All three of these properties increase with pressure. However, conduction is proportional to thermal conductivity while convection decreases with viscosity and thermal conductivity, but increases with density.

The failure of the flow line insulation in a pressurized annulus described above resulted from failing to fully appreciate that the "conductivity" of conventional insulation is actually an "effective" value based on a combination of convection and conduction. It was assumed that because thermal conductivity of gases is only weakly dependent on pressure, pressurizing the annulus to reduce the pressure differential with ambient sea water (and therefore the weight of the casing) would have only a nominal effect on heat loss. However, because gases are highly compressible, the change in density is much greater than the change in thermal conductivity and viscosity, and the heat loss through the insulation was much greater than predicted. Perhaps because this new awareness came more or less concurrently with ITP's introduction of conventional foam in a partially evacuated annulus, a prevailing point of view has been created for many of those skilled in the art of offshore pipeline design. That point of view is simply that increasing pressure increases overall heat transfer and decreasing pressure decreases overall heat transfer. This is valid for gases, but as will be shown later the effect may be trivial or even reversed in liquids.

In the context of the experiences and industry divisions described above, it is counter-intuitive for those skilled in the art of designing and installing offshore pipelines and piping to design and build a pipeline with leak-proof containment for insulation, and not take advantage of the well-known high thermal resistance of conventional insulating materials, and it also is counter intuitive to use a fluid that is neither finely divided nor gaseous. However, as the inventor has uniquely recognized, using liquids for insulating submarine piping and pipelines offers a number of advantages over conventional forms of pipeline insulation of the prior art, and there are physical difference between using liquids to insulate production tubing in a well and a pipeline. In a well, the tubing is removable and the casing is permanent and supported by the earth. In a pipeline, the pipe or conduit to be insulated is submerged and surrounded by water in the ambient environment. In a pipeline, the pipe or conduit is also more or less permanently connected to the means for containing the liquid insulation (i.e., the outer container to the conduit). Several of the advantages of liquid insulation for pipelines are discussed in the paragraphs that follow.

One advantage of liquid insulation in a pressurized environment is that pressure will usually have a relatively small impact on heat loss, and can actually lower heat loss in some cases. This is not obvious to most of those skilled in the art of offshore pipelines or submarine piping for reasons described above. Since many liquids are only slightly compressible the increase in density is minor, and the pressure and temperature dependence of thermal conductivity (compared with viscosity) are relatively insensitive to changes in pressure and temperature.

Above the temperature at which convection becomes a significant fraction of total heat loss, increases in conduction due to increases thermal conductivity with pressure is countered by decreases in convection. Consequently, the decrease in heat loss due to increases in viscosity with pressure can affect overall heat transfer as much or even more than the corresponding increase in density and conductivity by choosing liquids with the right combination of properties for the application. This, in turn, allows pressurizing the annulus to reduce the cost, weight of the casing pipe and the time needed to weld it offshore.

Another advantage of using liquids for insulating fluid conduits over encased conventional insulation is that the space need not be so finely divided in liquids as in gases. This is because the higher viscosity and thermal conductivity of liquids counter the influence of the so called "characteristic length" on convection. The result is that under many common conditions, the annulus need not be divided at all, which simplifies the manufacturing process. At higher temperatures, or where a thicker annulus is needed to keep conduction low enough, simply dividing the annulus into a few parts will often serve the purpose.

Another advantage of liquid insulation is that it can be pressure balanced with ambient water to eliminate the driving force of leaks. When compared to wet insulation of the prior art, the need to contain the liquid does not introduce any new problem of leakage because wet insulating materials must bond to adjacent solids to resist water ingress. If ambient pressure is transmitted through the liquid insulation the only stress at the interface with solid materials is compressive and equal to ambient pressure, leaving no pressure to drive leaks, no place for leaks to go, and no need for a difficult-to-make bond to the adjacent solids.

In another advantage, the interfacial surface tension can be used as an inherent water block where the insulation pressure is very close to the ambient pressure. The density of insulating liquids can be controlled with additives at a given temperature and pressure to achieve this end. It is true that the density cannot be exactly matched to seawater density over a wide range of temperature and pressure so the top to bottom head of liquid insulation inside the containment means will be slightly different than the change in the adjacent seawater head. Even so, there can be no flow through a hole or crack in either direction if the area of the opening multiplied by the pressure difference is less than the interfacial surface tension multiplied by the perimeter of the opening. Some liquids with low conductivity are both waterproof and hydrophobic enough that it is easily feasible to keep pressure inside and outside the pipe within a range that natural force of interfacial surface tension will prevent leaks even through holes several millimeters in diameter. The containment means can be partitioned to keep the pressure differential within that range for larger differences in elevation that occur, for example in a riser. The result can be inherent resistance to leaks through small holes or cracks.

Another advantage of using liquids for insulating fluid conduits is that the maximum sustainable operating temperature of many liquids with suitable insulating properties is higher than the temperature at which popular wet insulating materials of the prior art begin to decompose. Therefore, liquids have potential to insulate hotter conduits than wet insulation of the prior art.

In another advantage, the liquids can be pumped into the containment means during or after installation of the piping or pipeline. This could be could be particularly useful for making field joints. In the case of piping on submarine apparatus a waterproof insulating liquid that is more or less dense than seawater could be injected into an open bottom or open top container that surrounds the apparatus after the entire assembly is submerged. For example it would be far easier to enclose an entire assembly of fluid conduits with a complicated geometry than to apply a uniform thickness of wet insulation as is done in the prior art. This is a very easy, removable and noninvasive way to insulate the piping used for sub-sea production trees, pipeline tie in sleds or manifolds. If the liquid insulation is pumped into an annulus in an encased pipeline when or after a pipeline is laid, then there will be no discontinuity in the insulation at the field joint.

Another advantage of liquid insulation for fluid conduits is that there is no need for a primer coating on the outside of the line pipe if the insulating liquid is not corrosive. This saves time, reduces the cost of coating and pipe transportation.

Another advantage of insulating fluid conduits with a liquid is that the manufacturing process is straightforward assembly that requires little special application equipment or skill. It can be done in any fabrication yard that has adequate pipe handling and storage capability, and if the liquid insulation is injected after a pipeline is installed, the barge time for making of the field joint is reduced to joining the casing pipes. The field joint and pipeline insulation are one and the same.

In another advantage of liquids over wet insulation of the prior art is that liquids are much better suited for direct heating. The lower insulating cost and lower heat loss combined with elimination of concerns about electrolysis resulting from leaks at the field joint could make continuous direct heating of liquid insulated pipelines less expensive than pipelines with encased conventional insulation.

Finally, another advantage is that a heated liquid can be caused to flow through a space between a containment means and the fluid conduit to be heated and insulated so as to warm the fluid conduit, and the same or a different liquid can be contained in the same space to insulate the fluid conduit thereafter. This could be particularly useful for heating offshore flow lines.

D. Suitable Liquid Insulating Materials

Discussion now turns to suitable liquid insulating materials. For reasons described above, heat that flows through one material may be less than another material in some conditions and not others even with the same geometry because properties change with temperature and pressure. Important properties not directly related to heat flow include operating temperature limits, price, toxicity, odor, corrosiveness and availability. Dielectric properties may be important for pipelines that employ direct heating. The ideal viscosity curve may depend on whether the liquid is to be pumped over a long distance into the enclosure during or after installation.

Both thermal and electrical conductivity decrease with the space between the molecules for a given frequency of molecular vibration. Plasticizers make brittle materials more flexible because they increase "free space" between molecules. Not surprisingly, liquid plasticizers exhibit low thermal conductivity, and many of these are also quite viscous. Similarly, liquids that have good dielectric properties often have low thermal conductivity as well, and some also have high viscosity. It therefore makes sense to consider viscous liquids known to be used as plasticizers or dielectric fluids, including and polybutene and various esters.

Polybutene (a.k.a. Polyisobutylene or PIB) is a family of moderately priced synthetic hydrocarbons used as plasticizers, "tackifiers", and dielectric fluids. The viscosity can be closely controlled over a wide range by varying the molecular weight. Polybutenes are also quite hydrophobic, have density near that of water, their thermal conductivity is lower than solid wet insulating materials of the prior art, they are stable over a very wide range of temperatures, and they have very low oral toxicity.

Esters used as plasticizers include sebacates, adipates, teraphalates, dibenzoates, gluterates, phthalates, and azelates, benzoates and trimellitates. Some have low thermal conductivity, and many are quite viscous as well. Di-isodecyl phthalate and Di-octyl phthalate are less conductive solid wet insulating materials now on the market. Their densities are near that of water. They are readily available in large quantity at moderate price and have acceptably low toxicity. Some fluorocarbons used as refrigerants have thermal conductivity that is considerably lower than any of the above materials, but their viscosity is such they would have to be finely divided to prevent convection. Some other low conductivity liquids are toxic and some are unstable or even explosive.

Materials used as electrically insulating liquids include light mineral oils, n-hexane and n-heptane, synthetic hydrocarbons including polybutene, vegetable oils including castor oil, and high olec sunflower oil, soy oils and their esters. Synthetic esters and silicone based fluids, such as silanes, siloxanes like polydimethylsiloxane are generally more expensive than some dielectric fluids with lower thermal conductivity. The benefits that may justify the higher cost of silicone based materials are that viscosity changes less with temperature than most other liquids and can be controlled in manufacture, they are stable over a wide temperature range, and some are very hydrophobic.

Given that overall cost effectiveness is the ultimate driver of what materials are most suitable, some less expensive materials may work out to be the best choices in some cases. These include certain wood oils and wood oil derivatives such as tall oil rosinate, liquid rosin and fatty acids. The lowest cost insulating liquids may be unrefined heavy crude oil and fuel oils, including standard petroleum fuel oils and bio fuels. For flow lines from producing wells, the produced crude that has been processed to remove water and wax has the advantage of availability at the site.

The liquid insulation materials described above and others can be mixed or modified with other additives known in the art for controlling viscosity or density.

Some materials that are gases or liquid at standard conditions have very low thermal conductivity in their supercritical states, but must be finely divided with materials like microporous solids or more conventional foam to be used under supercritical conditions. Examples of such insulating liquids (supercritical fluids) include methane, argon and carbon dioxide, which may in fact be a refined part of the production stream that is carried by the insulated conduit.

E. Embodiments of Fluid Conduits Insulated with Liquid Insulation

FIGS. 2 through 11 illustrate various arrangements for insulating conduits with liquid. It will be appreciated with the benefit of the present disclosure, that the teachings of the liquid insulation disclosed herein can apply to other forms of fluid conductors, including, but not limited to, piping, pipelines, flow lines, conduits, risers, valves, chokes, wellheads, blowout preventers, and the like.

Figure 2:
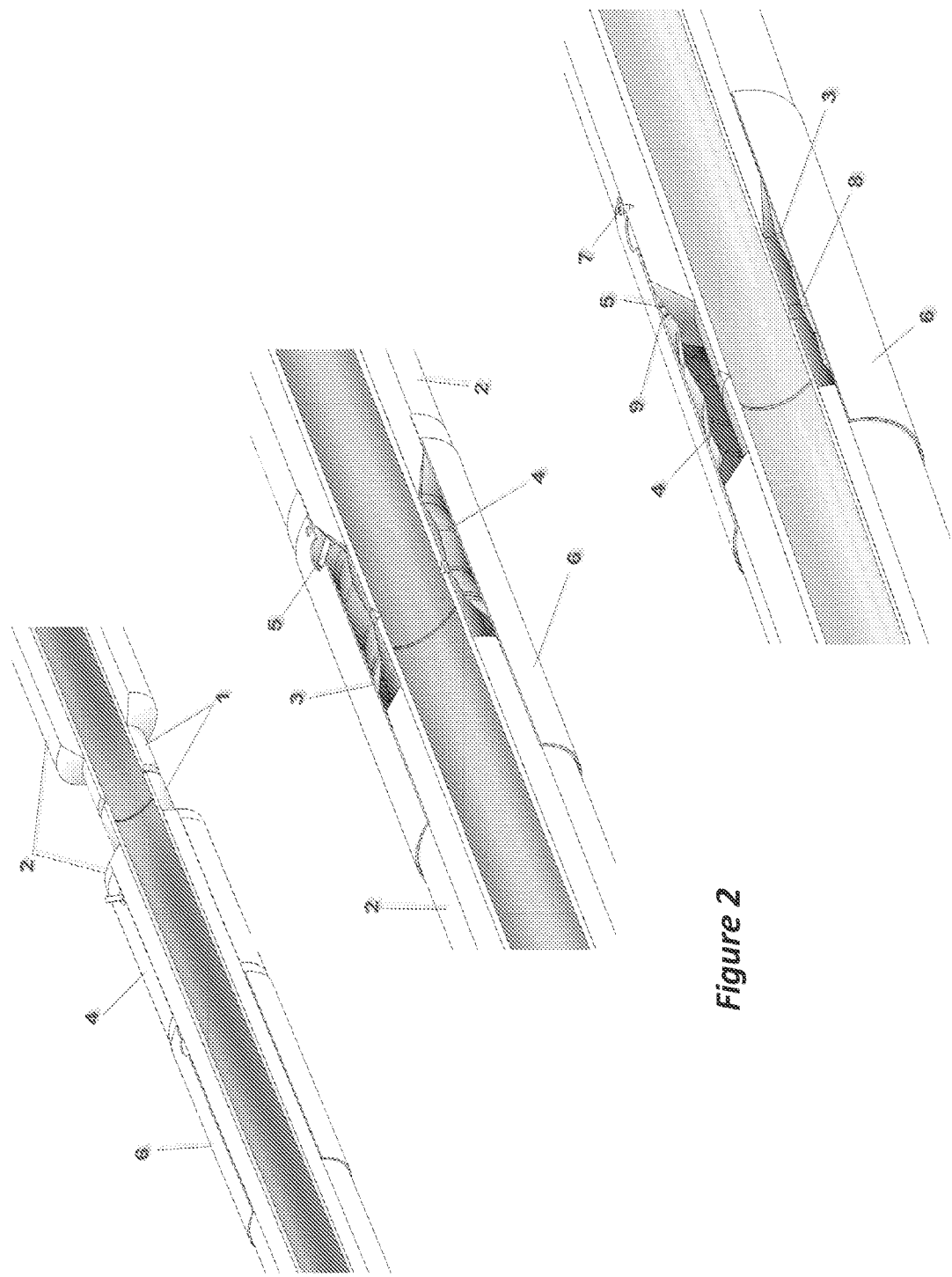
FIGS. 2 and 2a-c show a submarine or buried pipeline field joint having a liquid insulating material separated from seawater by a flexible membrane (contained in a cylindrical sleeve) that transmits ambient hydrostatic pressure into the liquid insulation.
Figure 2A:
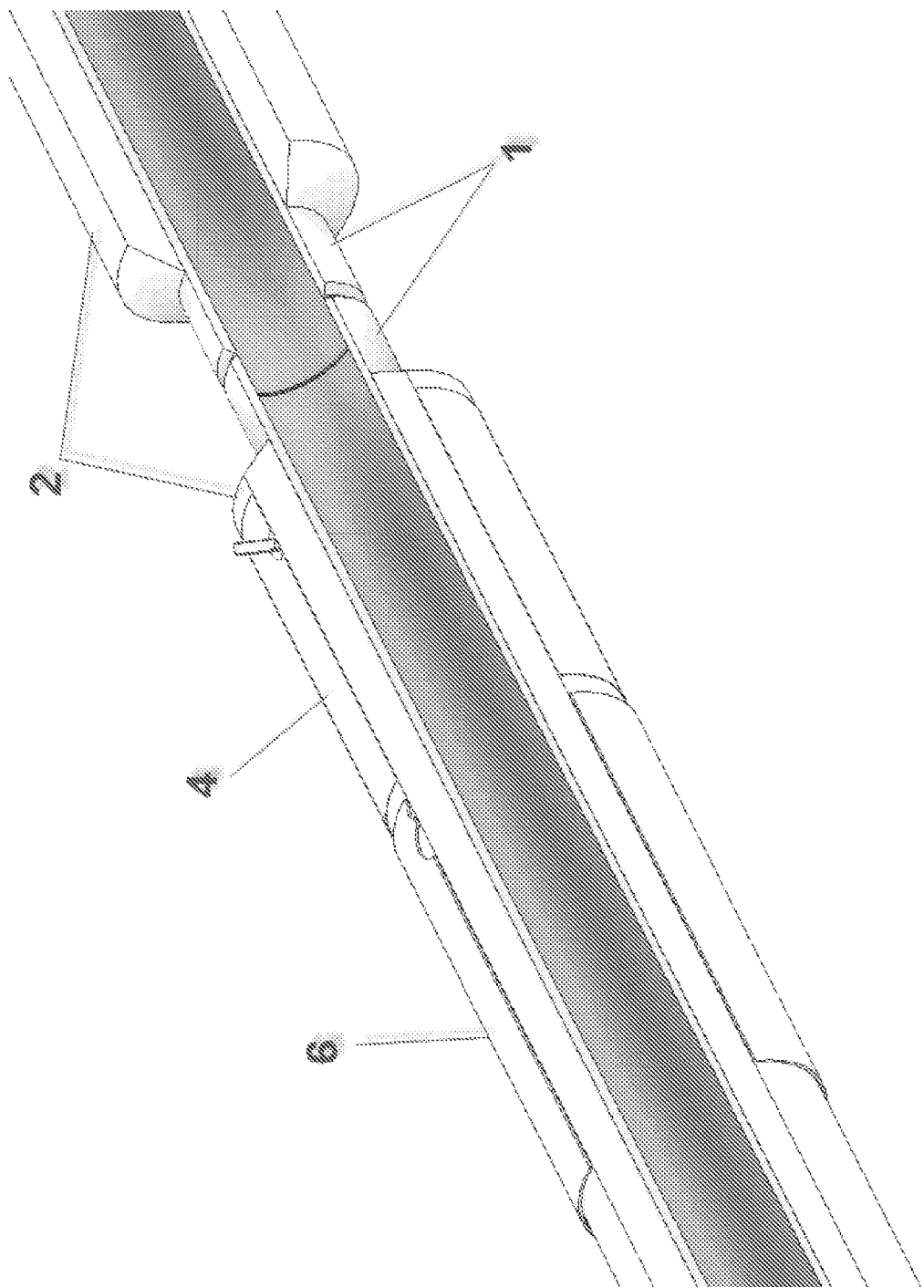

FIG. 2 shows an insulated submarine pipeline field joint in three stages of assembly. FIG. 2a shows that before the pipes (1) are welded together, a sleeve (6) and flexible membrane (4) are slipped over the factory applied insulation (2) on one of the pipes (1).

Figure 2B:
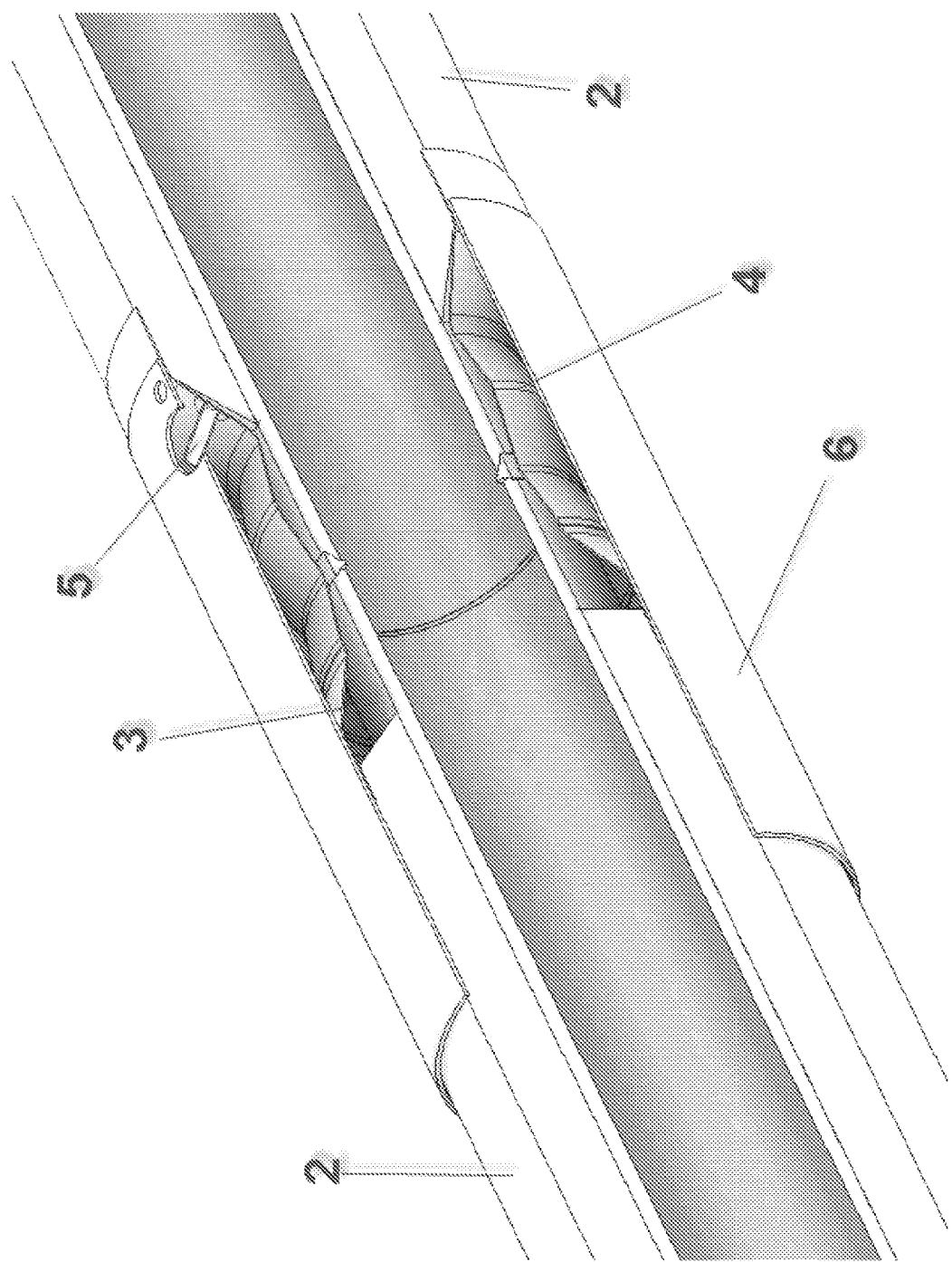

FIG. 2b shows that after the pipes (1) are welded, the flexible membrane (4) and the sleeve (6) are moved axially so to enclose an annulus between the pre-applied solid insulation (2). The annulus is then filled with liquid insulation (3) through a fill port (5), which can be accessed through a window or opening on the external sleeve (6).

Figure 2C:
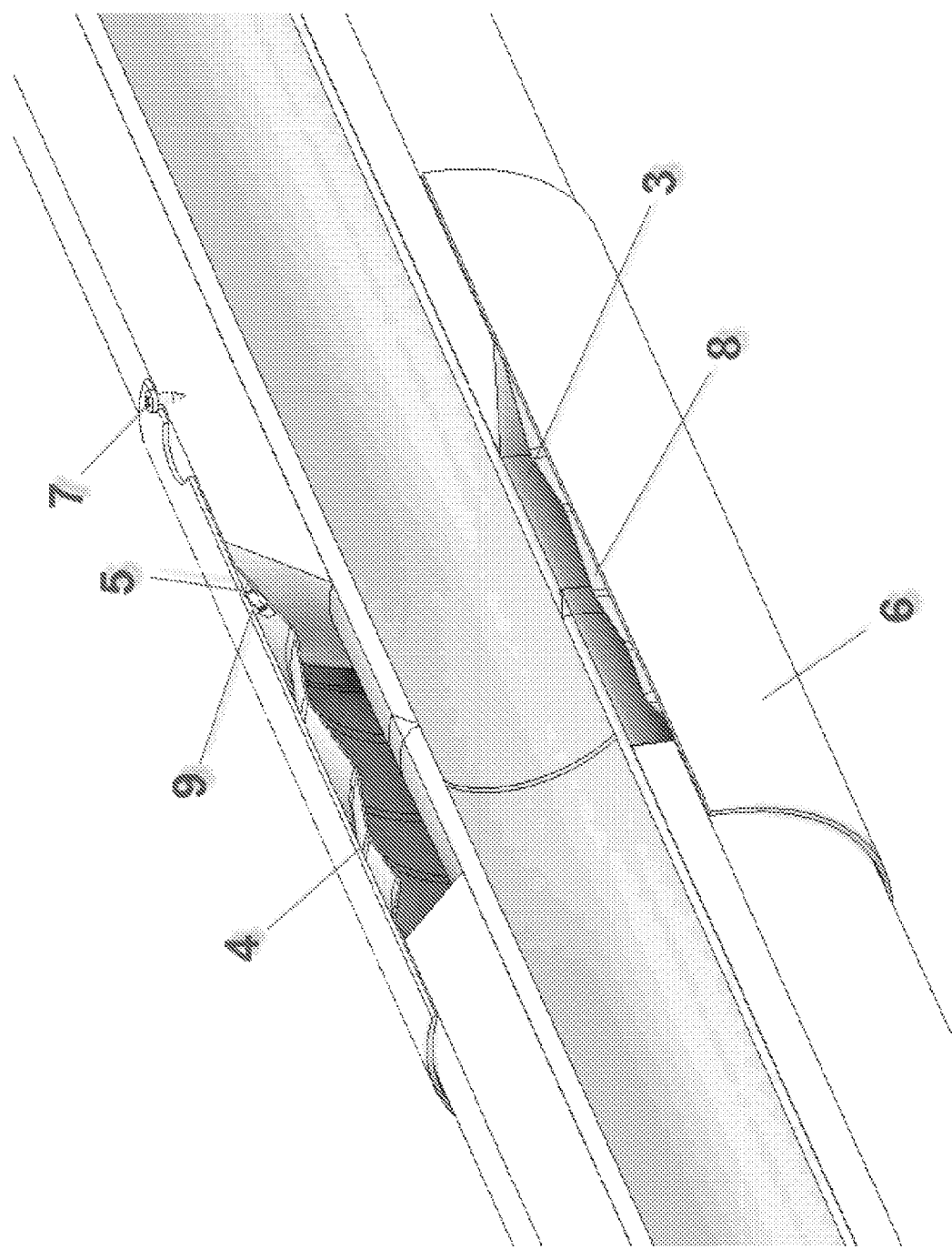

FIG. 2c shows the field joint after the liquid insulation (3) has filled the annulus. A closure (9) for the fill port (5) is sealed, and the sleeve (6) is positioned affixed in place by fastening means (7). In the final configuration, the membrane (4) serves to separate the liquid insulation (3) from ambient water (8) and transmits the ambient pressure into the insulating liquid (3) to minimize the any differential pressure that could cause a leak. The sleeve (6) serves to resist external impact and contact loads during and after insulation. The membrane (4) can be a bladder, bellows or diaphragm, and in some cases the function of the membrane (4) may be served by making the sleeve (6) of an elastic or viscoelastic material.

Figure 3:
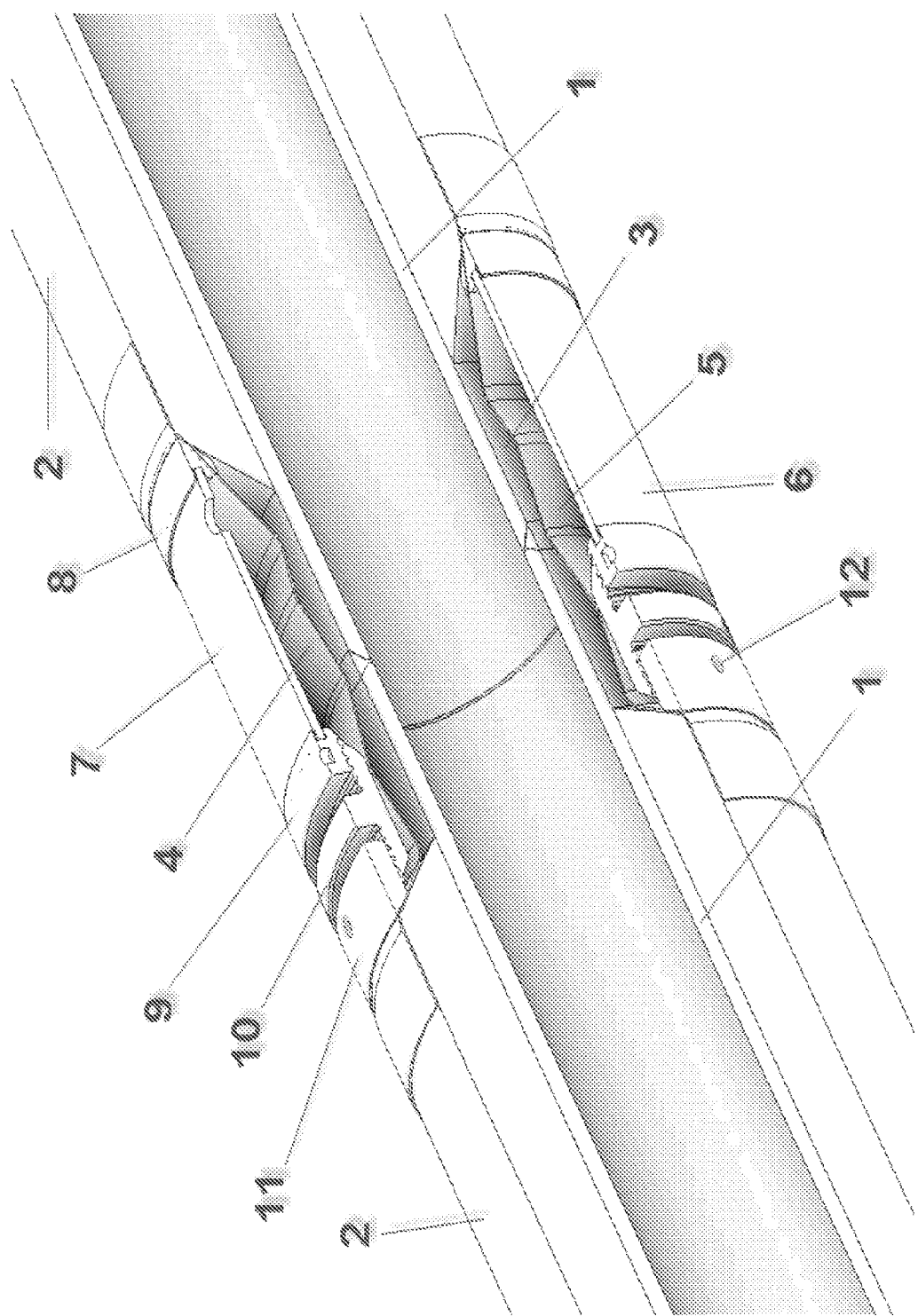
FIG. 3 shows another submarine or buried pipeline field joint having a liquid insulating material separated from seawater by a flexible membrane (contained in a split sleeve) that transmits ambient hydrostatic pressure.

FIG. 3 shows an assembled field joint on a submarine conduit or pipeline. This field joint differs from the field joint in FIG. 2a-c in that the outside diameter of the joint is substantially the same as the diameter of the pre-applied insulation (2) so as to minimize impact during the pipe lay processes. A flexible membrane (4) completes an annular space bounded by the pre-applied insulation (2), the flexible membrane (4), and the pipes (1).

Figure 4A:
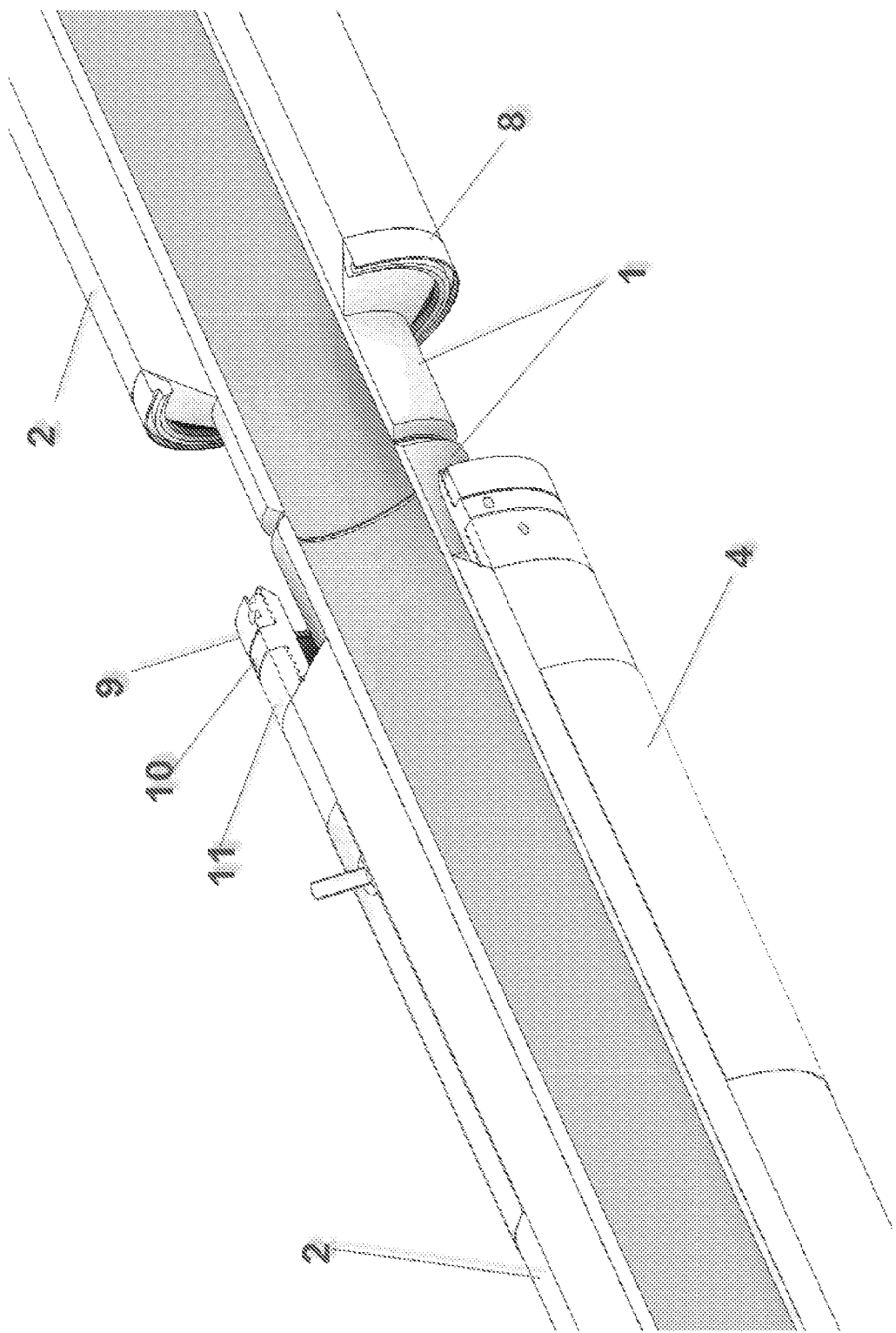
FIGS. 4a-c show the installation sequence for the field joint of FIG. 3.
Figure 4B:
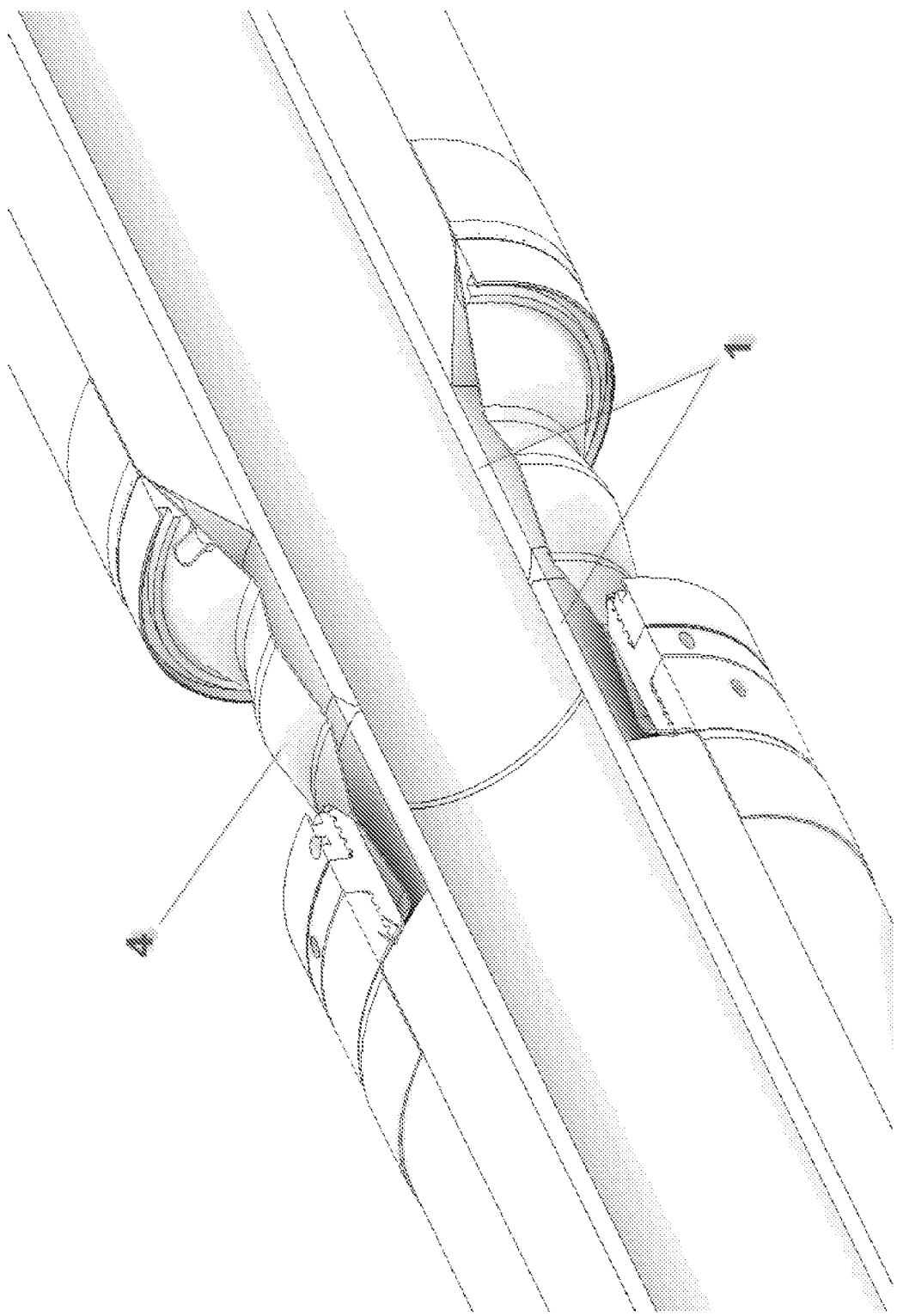
Figure 4C:
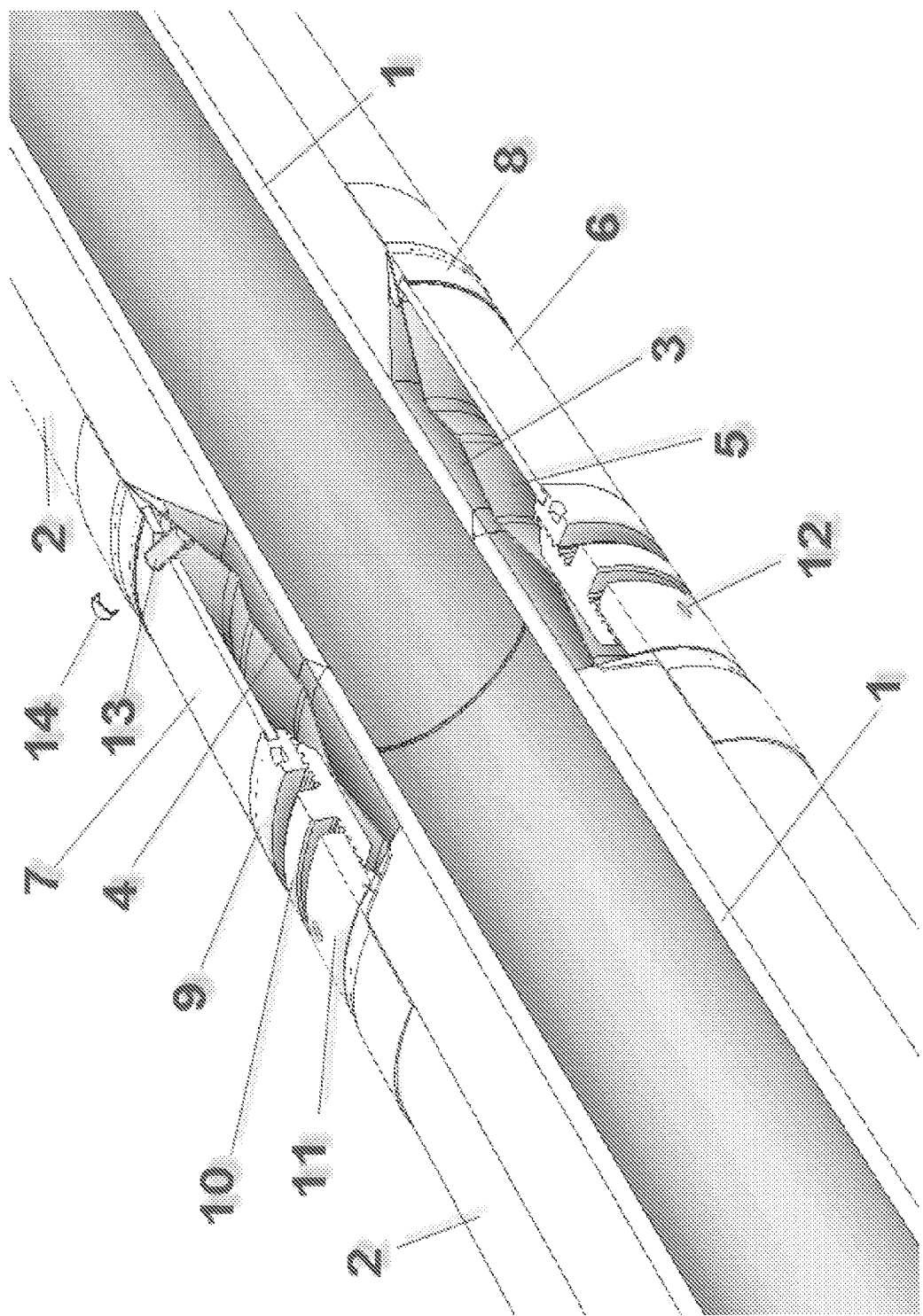

The membrane (4) in FIG. 3 serves to physically separate the liquid insulation (3) from ambient water (5). Here, the membrane (4) is surrounded and protected from external loads by half shells (6 and 7) that are captured and supported on one end by a ring (8) and on the other end by a threaded ring (9) that is engaged with a threaded adapter (10). The threaded adapter (10) is also engaged with a threaded collar (11). The collar (11) and ring (8) contact, and are supported by the pre-applied insulation (2). One or more fasteners (12) prevent rotation of threaded ring (9) so that the assembly remains supported by the pre-applied insulation (2). The membrane (4) can be a bladder, bellows or diaphragm, and can be assembled and filled in the same way described above. FIGS. 4a-c illustrate the installation sequence for this field joint.

FIG. 4a shows that before the pipes (1) are welded together the flexible membrane (4) is slipped over the pre-applied insulation (2). The ring (8) and the threaded components (threaded ring 9, adapter 10 and collar 11) are slipped over the pipes (1).

FIG. 4b shows that, after the pipes (1) are welded together, the flexible membrane (4) is moved axially into its final position to create a sealed annular area.

FIG. 4c shows that the shells (6 and 7) are then installed. The female threads on the threaded ring (9) and on the collar (11) are opposite hand. When the adapter (10) is rotated, the entire threaded assembly elongates until the ring (8) and collar (11) are firmly seated against the pre-applied insulation (2).

The relative rotation of the threaded components (9, 10, and 11) is then secured by fastening means, such as lock screws (12) or the like. The liquid insulation (3) is then pumped through a fill port (13). When the annulus is full, the fill port (13) is finally sealed with a closure (14).

Figure 5:
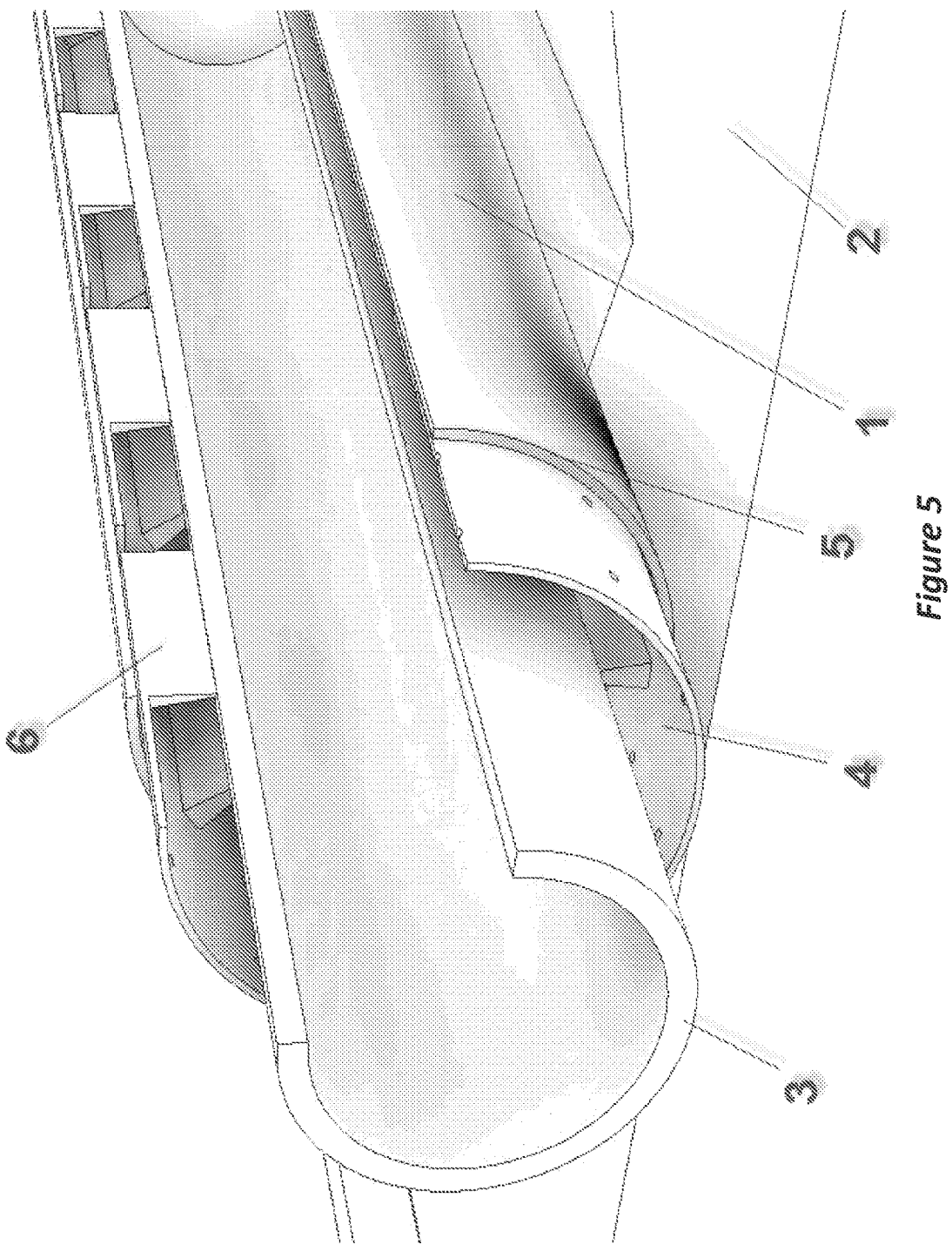
FIG. 5 shows a submarine or buried pipeline having line pipe inside a casing pipe held concentric by spacers to create an annulus that is filled with an insulating liquid that is not partitioned along its length.

FIG. 5 shows a portion of another fluid conductor according to the present disclosure. A pipeline (1) lying on the seabed (2) comprises line pipe (3) surrounded by liquid insulation (4) and a larger casing pipe (5). The casing pipe (5) is connected to the line pipe (3) with mechanical supports (6) that hold the pipe (3) and casing pipe (5) in a fixed axial and (more or less) concentric radial position. Some or all of these supports (6) transmit enough shear loads from the line pipe (3) to the casing pipe (5) so the pipeline (1) can be laid without relative axial movement between the pipes (3) and (5). The supports (6) allow the liquid insulation (4) contained in the annulus between the line pipe (3) and casing pipe (5) to communicate axially along the pipeline (1) to the surface so that the pressure in the annulus is equal to the head of the liquid insulation (4). This can reduce the pressure difference between the ambient seawater in the surrounding environment and the insulating liquid (4) inside the annulus.

Figure 6:
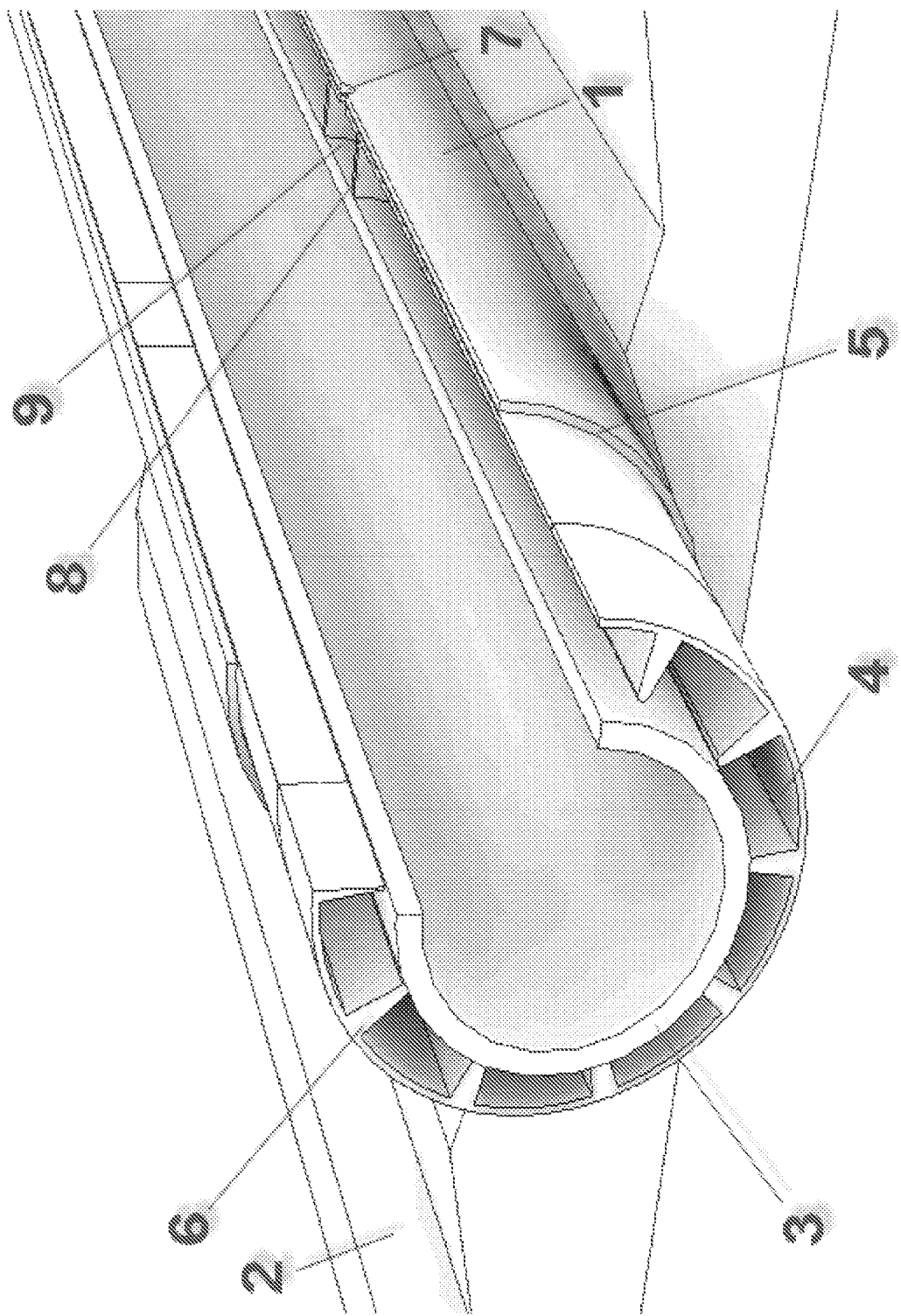
FIG. 6 shows a submarine or buried pipeline having line pipe inside casing pipe held concentric by spacers to create an annulus that is filled with an insulating liquid. The annulus is partitioned along its length, and each partitioned section includes a flexible membrane that transmits ambient pressure into the insulating liquid in that section.

FIG. 6 shows a portion of another fluid conductor according to the present disclosure. The pipeline (1) lying on the seabed (2) comprises line pipe (3) surrounded by liquid insulation (4) contained in a larger casing pipe (5). The casing pipe (5) is connected to the line pipe (3) with mechanical supports (6) that hold the pipes (3 and 5) in a fixed axial and (more or less) concentric radial position. Some or all of these supports (6) transmit enough shear loads from the line pipe (3) to the casing pipe (5) so the pipeline (1) can be laid without relative axial movement between the line pipe (3) and the casing pipe (5). This pipeline (1) differs from the one in FIG. 5 in that concentric rings (9) are installed to longitudinally compartmentalize the liquid insulation (4) contained in the annulus between the line pipe (3) and the casing (5). Each annular compartment includes a flexible membrane (8) that separates the liquid insulation (4) from ambient water (9) and transmits ambient pressure into the insulating liquid (4). The annular compartments are filled from ports (7) on the casing (5). The membrane (8) can be a bladder, bellows, or diaphragm, and in some cases the function of the membrane (8) may be served by the casing (5) by making it of an elastic or viscoelastic material.

Figure 7:
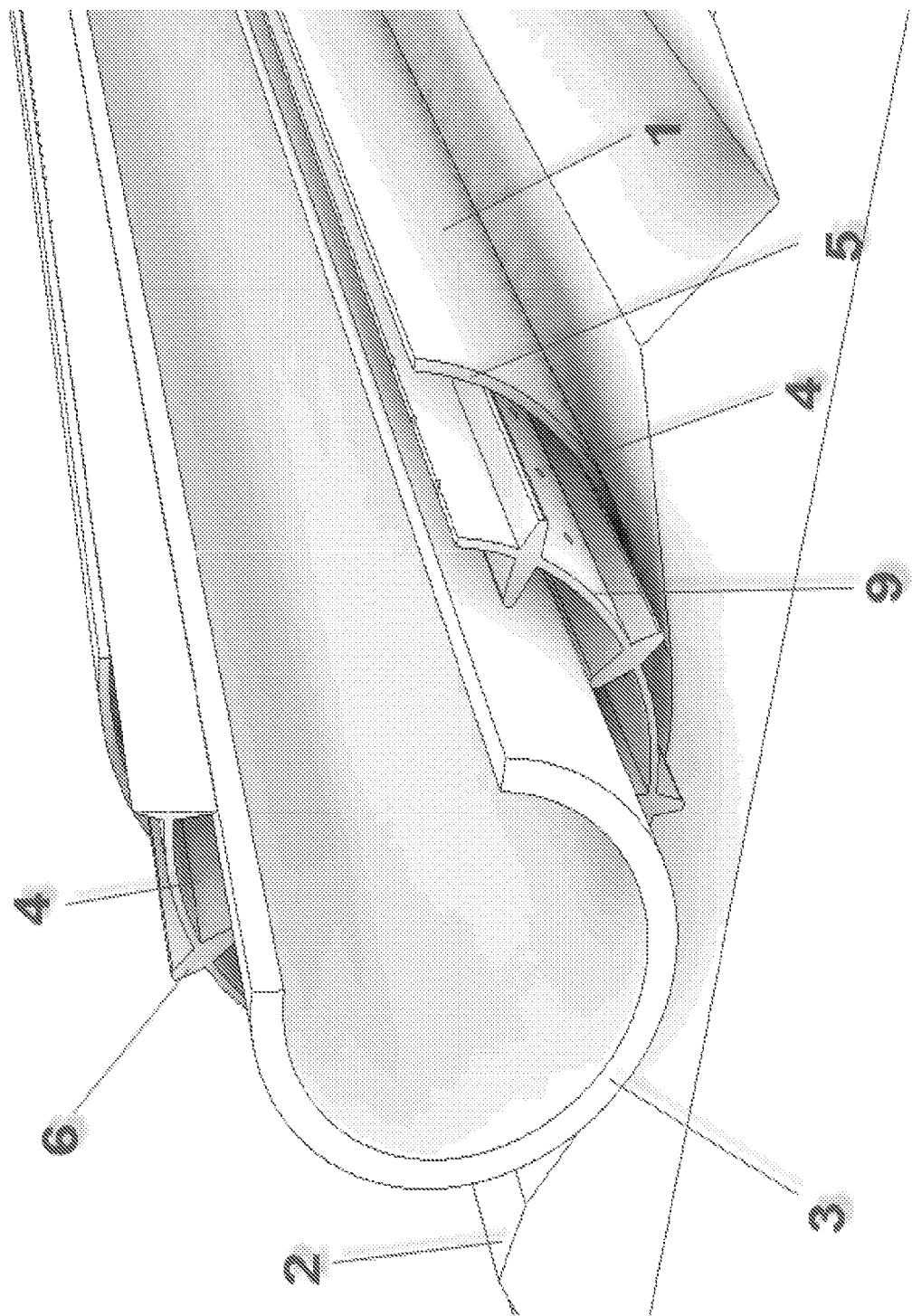
FIG. 7 is a submarine or buried pipeline similar to those in FIG. 5 or FIG. 6 with a thin cylinder that divides the annulus between the line pipe and the casing pipe into two parts to reduce radial convection.

In FIG. 7, the fluid conductor according to the present disclosure is a pipeline (1) as in FIG. 5 comprising line pipe (3) with casing pipe (5) enclosing liquid insulation (4) that may be like the pipeline in FIG. 5 or 6 with the addition of one or more thin wall cylinders (9) that divide the annulus between the spacers (6) into two or more concentric annuli. These thin cylinders (9) serve to reduce the radial characteristic length of the liquid volume to reduce thermal convection. Some communication ports may be provided in the wall of cylinders (9) to permit some limited fluid communication of the liquid insulation (4) between the concentric annuli.

Figure 8:
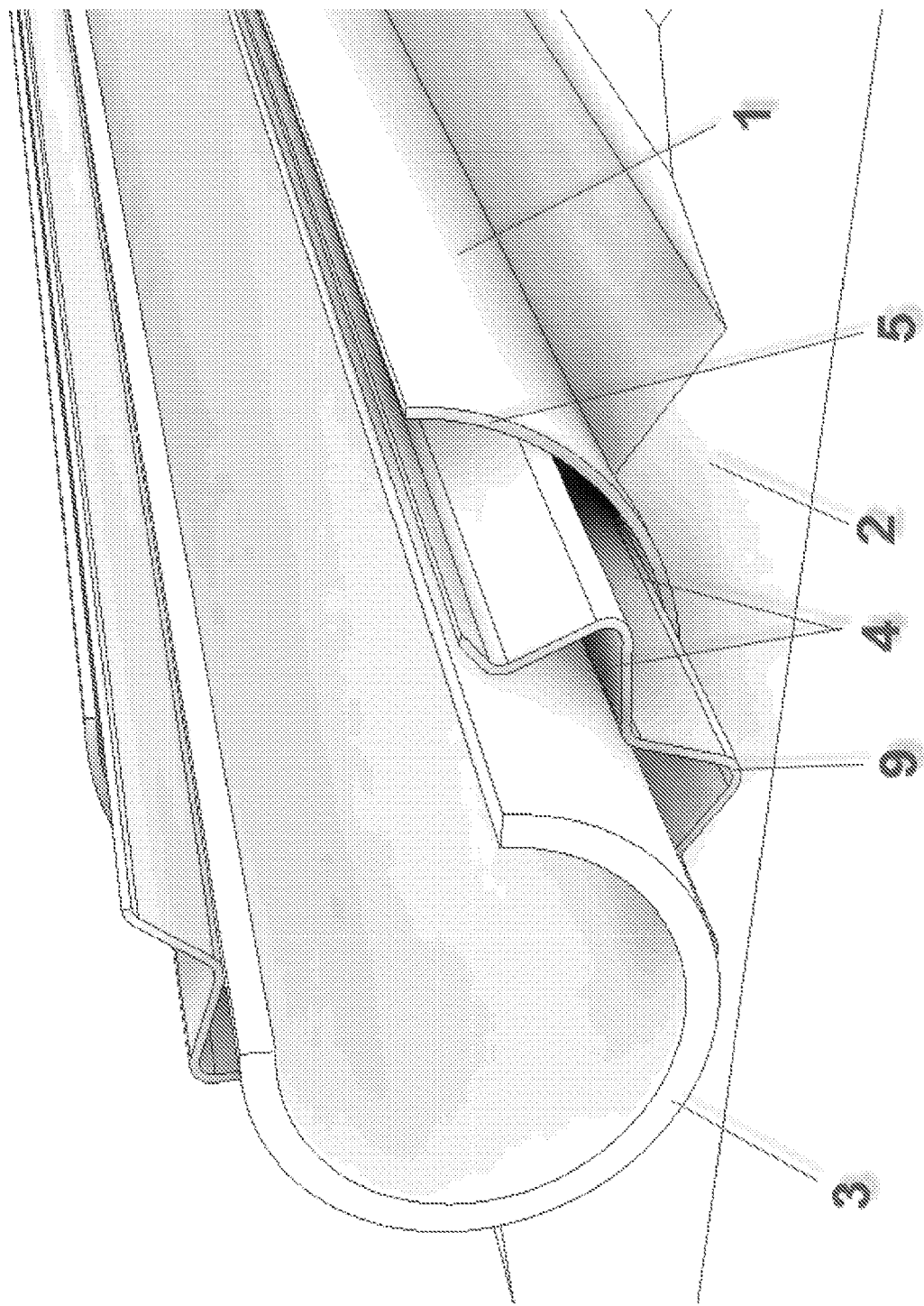
FIG. 8 shows a submarine or buried pipeline similar to those in FIG. 5 or FIG. 6 with a thin corrugated partition that divides the annulus between the line pipe and the casing pipe into two radial segments to reduce circumferential convection.

In FIG. 8, a fluid conductor according to the present disclosure includes a pipeline (1) like the one in FIG. 5 or 6 comprising line pipe (3) with casing pipe (5) enclosing liquid insulation (4) with the addition of a thin corrugated partition (9) that divides the annulus into segments to reduce circumferential characteristic length of the liquid volume to reduce thermal convection. The corrugated partition (9) can also serve as mechanical supports (6) between the line pipe (3) and the casing pipe (5). A similar modification can be made to the other fluid conductors disclosed herein. A combination of any of the axial and radial partitions of FIGS. 5 through 8 can be used together to reduce both radial and circumferential convection.

Figure 9:
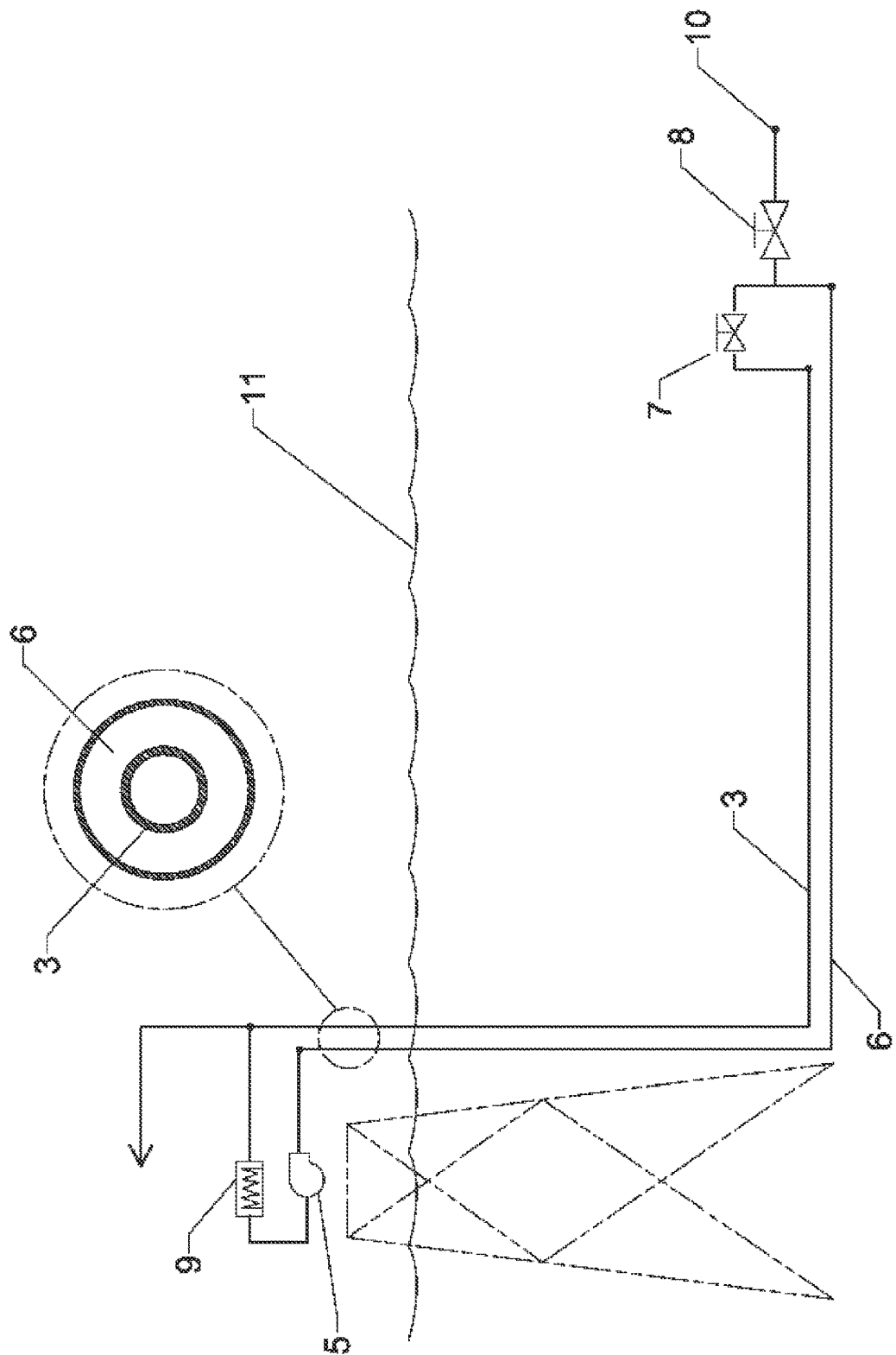
FIG. 9 is a schematic of a submarine or buried pipeline according to the present disclosure having a pump connected to the pipeline's annulus to move a benign fluid through the annulus and having a valve feeding into the line pipe. This enables the operator to displace or dilute the produced fluids in the pipeline before the pipeline is shut in, and thereby eliminate the problems of wax precipitation, high viscosity at low temperature or the formation of hydrates when the contents cool. The insulating liquid may be the same or different from the liquid used to displace the insulating liquid into the line pipe, and this liquid may also be heated. It is also possible to pig the line pipe from the platform to drive the insulating liquid back into the annulus before restarting the flow from the well.

FIG. 9 shows another fluid conductor according to the present disclosure, which can be similar to other pipelines (1) disclosed herein, such as in FIG. 5. A pump (5) is connected to the annulus (6) between the fluid conduit and a casing to move a benign fluid through the annulus (6) and then through a valve (7) into the line pipe (3) to displace the normally transported fluids from the pipeline (1). Ideally, the "benign fluid" can be a fluid that can be pumped at the temperature of ambient seawater. In the simplest scenario, the benign fluid is also the insulating liquid. For example, produced crude oil made benign on the offshore platform by removing paraffin and water can serve both purposes if stored in a tank of a floating storage vessel until needed.

The insulating liquid in the fluid conductor in FIG. 9 may be the same or different from the liquid used to displace the insulating liquid into the line pipe, and may be heated. Before resuming production, the valve (7) is closed to block flow in the annulus. If the valve (7) is a check valve, this step is automatic, but this may not be the preferred because it would prevent reverse flow through the annulus (6) due to running a pig from the pipeline (1) though the pipe (3). This ability to allow reverse flow would allow the annulus (6) to be used to return the insulating fluid from the pipeline (1) to the annulus (6) before restarting the pipeline (1) after shut down.

If the insulating liquid is different from the benign fluid, then the insulating liquid is pumped into the annulus (6) to displace the benign fluid into the pipeline (1) before closing the valve (7). In a slightly different arrangement, the valve (7) remains partially open for a period of time to dilute the production fluid until it is above the acute temperature. Then, the valve (7) is closed.

As further shown in FIG. 9, a secondary valve (8) and a heater (9) are additional features that can be added to heat the pipeline (1). In particular, the secondary valve (8) can be opened, and the primary valve (7) can be closed to redirect the flow of benign liquid from the annulus into another pipeline (10) or directly into the ocean (11). In this case, the temperature of the benign liquid is raised by the heater (10) so the heated liquid warms the produced fluids in the line pipe (3). Either way, a liquid or solid may surround and insulate the casing pipe (5) from seawater (11).

Figure 10:
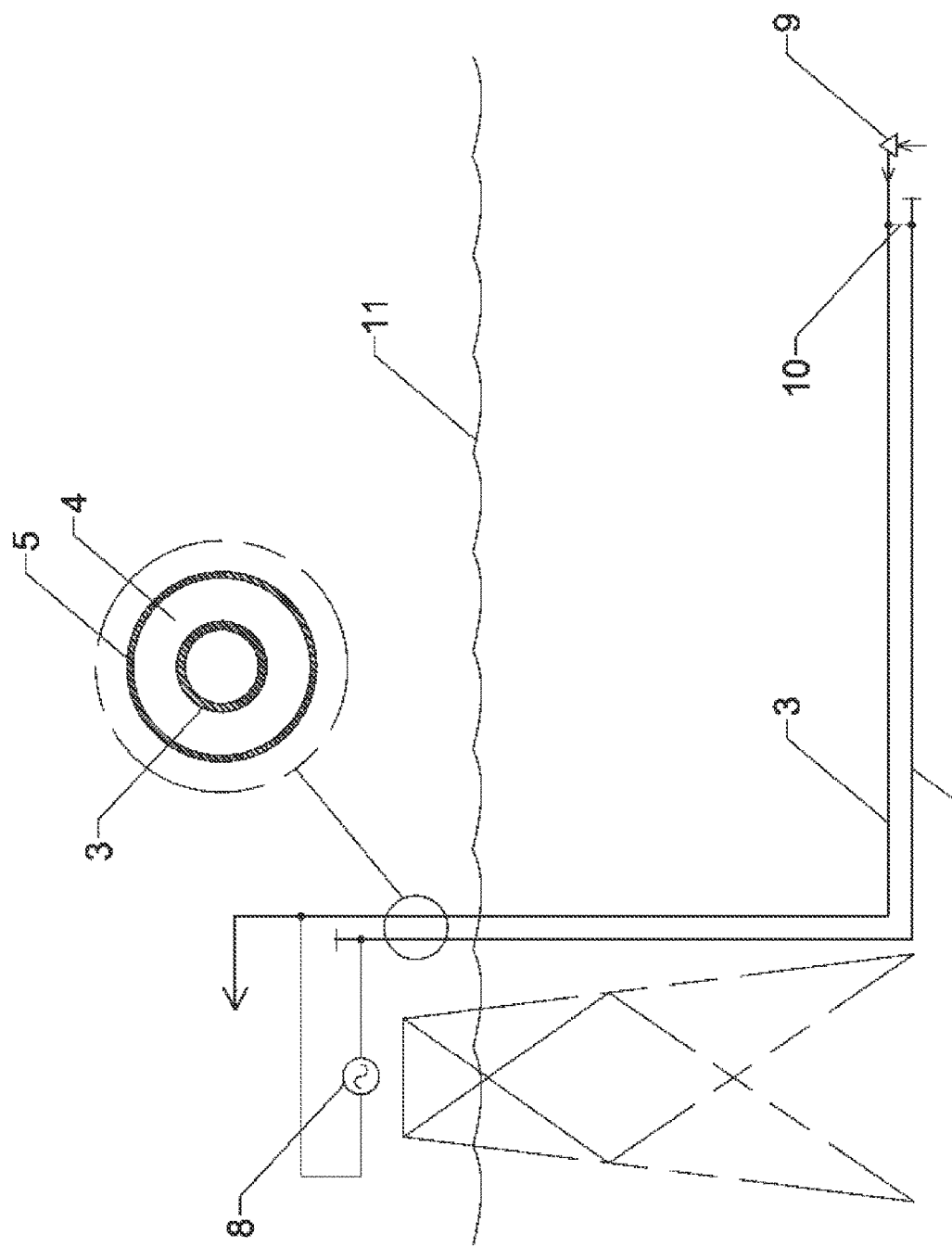
FIG. 10 is a schematic of a submarine or buried pipeline according to the present disclosure having the line pipe electrically connected to a generator that causes electric current to flow through the line pipe and cause direct or impedance heating of the line pipe. The liquid insulation (4) is also an electrical insulating material. The return path of the electrical current is the casing.

FIG. 10 shows another fluid conductor according to the present disclosure, which can be similar to other pipeline in FIG. 5. One leg of a generator (8) is electrically connected to the line pipe (3), and the other leg of the generator (8) is electrically connected to the casing pipe (5) made of a magnetic metal. The line pipe (3) is shown as carrying flow from a wellhead (9). The casing and line pipes (3 and 5) are electrically insulated from each other by the liquid insulation (4) except for an electrical connection (10) that electrically connects them near the end of the section of pipeline (1) to be heated. Alternating electric current flows through the line pipe (3) and returns through the casing (5) cause impedance heating of the line pipe (3). The casing (5) and line pipe (3) are both thick enough that the skin effect will cause the current to flow on the inside of the casing pipe (5) and the outside of the line pipe (3), thereby electrically insulating the casing (5) from ambient seawater and the carrier pipe (3) from the carried fluids. Ideally in this case, the casing (5) offers less electrical resistance than the line pipe (3), and most of the heating would occur in the line pipe (3). The casing (5) in such cases can be protected by corrosion in the conventional way—i.e., by applying an anti-corrosion coating and a cathodic protection system on the casing (5). The disadvantage of trying to fully exploit the electrically insulating nature of the skin effect is that the requirement for a minimum thickness of a magnetic material it is a limiting factor in reducing the weight of the carrier line pipe (3).

Figure 11:
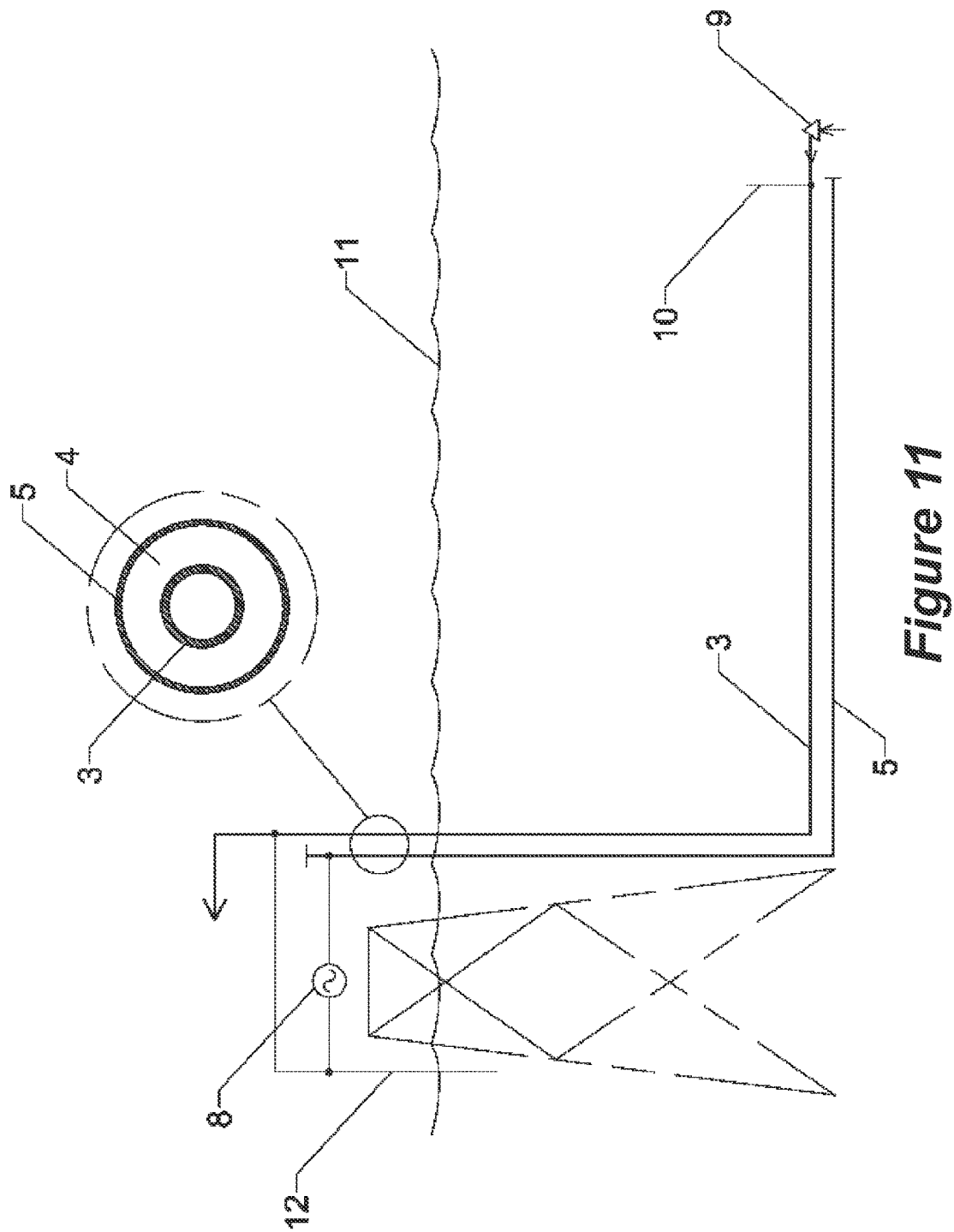
FIG. 11 is a schematic of a submarine or buried pipeline according to the present disclosure having a return path of electrical current flow through seawater electrodes to ground.

FIG. 11 shows another fluid conductor according to the present disclosure, which can be similar to FIG. 10. The line pipe (3) is electrically connected to a generator (8) and causes electric current to flow through the line pipe (3). This pipeline differs from the pipeline in FIG. 10 in that return path of the current is through an electrode (10) through which current then flows into the seawater (11) to ground. Other differences between this embodiment and FIG. 10 are that the pipe needs only to be an electrical conductor, not necessarily magnetic and the electric current can be either AC or DC. The other leg of the generator (8) is similarly grounded through another submerged electrode (12) through which current passes into the seawater ground in a manner as described in U.S. Pat. No. 6,049,657. If the casing pipe (5 in FIG. 7) is made of metal, it will be protected with an anti-corrosion coating and a cathodic protection system typical of the prior art. If the casing (5) is made of a material that is not electrically conductive then the anti-corrosion measures are not necessary to protect the casing (5).

For the purpose of this disclosure, fluid conduits, piping, pipelines, flow lines and conductors discussed herein are defined as being within the scope of ASTM B31.X where X can be any of the following 1, 2, 3, 4, 5, 8 or 11. However, rather than being restricted to "gas" as in ASTM B31.8 § 803.18, the flow conduits can pertain to gas, liquid, slurry, or the like. Moreover, the conductors as disclosed herein can include submerged, buried, or below-grade piping and pipelines downstream of a wellhead.

The foregoing description of preferred and other embodiments is not intended to limit or restrict the scope or applicability of the inventive concepts conceived of by the Applicant. With the benefit of the present disclosure, features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicant desire all patent rights afforded by the appended claims. Therefore, it is intended that the appended claims include all modifications and alterations to the full extent that they come within the scope of the following claims or the equivalents thereof.

The invention claimed is:

1. A fluid transport apparatus such as a flowline, pipeline, riser or liquid passageway connected thereto that is submerged or below grade in an environment where ambient pressure is higher than at grade, the apparatus comprising a fluid transport conduit surrounded by a thermally insulating liquid contained in a larger conduit, the thermally insulating liquid being a primary resistance to heat flow between the fluid transport conduit and the environment and further serving to prevent leaking through or collapse of the larger conduit under the ambient pressure tending to occur in an absence of the insulating liquid.

2. A fluid transport apparatus of claim 1 in which the larger conduit is flexible and transmits the ambient pressure into the insulating liquid to reduce any difference in pressure inside and outside of the larger, flexible conduit that is possibly but not necessarily an elongated bladder contained in a more rigid conduit that allows ambient liquid to reach the surface of the flexible conduit and provides mechanical support to the flexible conduit.

3. A fluid transport apparatus of claim 1 in which a plurality of supports separates the fluid transport conduit from the larger conduit and approximately fixes the position of one relative to the other.

4. A fluid transport apparatus of claim 1 or 3 in which the space between the fluid transport conduit and the larger conduit is divided into smaller spaces to reduce heat transfer through the insulating liquid due to free convection, the divisions including partitions that are generally radial, circumferential or a combination of radial and circumferential, loose fill or open cell, porous solids such as foam or aerogel.

5. A fluid transport apparatus such as a flowline, pipeline, marine riser or liquid passageway connected thereto, the apparatus comprising a fluid transport conduit surrounded by an insulating liquid contained in a larger conduit, the insulating liquid being a primary resistance to heat flow between the fluid transport conduit and an ambient environment, wherein the fluid transport conduit conducts electric current from an electric generator source so as to cause resistance or AC impedance heating of the fluid transport conduit which transfers this heat into its content.

6. A fluid transport apparatus of claim 1 in which the space between the fluid transport conduit and the larger conduit is connected to a pump that can move liquid through the space and along the outside of the fluid transport conduit.

7. A fluid transport apparatus of claim 6 in which a valve opens and closes a fluid path that connects the space between the fluid transport conduit to the larger conduit so that liquid can be moved from one through the other.

8. A fluid transport apparatus of claim 6 in which a valve opens and closes a fluid path though the space between the fluid transport conduit and the larger conduit into third conduit.

9. A fluid transport apparatus of claim 6 in which a valve opens and closes a liquid flow path that connects the space between the fluid transport conduit and the larger conduit to the ambient environment for one of several purposes including displacing the insulating liquid with ambient water or enabling the fluid transport apparatus to be installed with water or some other liquid in the space between the two conduits that is displaced with the insulating liquid after the conduit pair is installed.

10. A fluid transport apparatus of claim 1 in which the insulating liquid is a supercritical fluid at some time during operation.

11. A fluid transport apparatus of claim 6 in which heat is added or removed from the fluid transfer conduit by pumping liquid through the space between the fluid transfer conduit and the larger conduit.

12. A fluid transport apparatus of claim 6 comprising motor controls, valves or both that provide operational control of whether the liquid in the space between the two conduits is moving for the purpose of transferring heat between the insulating liquid and a transported fluid or is static for the purpose of thermally insulating the transported fluid from the surroundings.

13. A fluid transport apparatus of claim 2 in which the space between the fluid transport conduit and the flexible conduit or conduits is separated into a plurality of axially separated compartments along the length of the fluid transport conduit that prevent mingling of the liquids in each compartment wherein the pressure in each compartment is transferred into it through the flexible conduit.

14. A fluid transport apparatus of claim 1 in which the larger conduit is a short section that is flexible or that contains a piston or diaphragm or other way to equalize pressure inside and outside the conduit and that surrounds field-joined bare ends of two fluid transport pipe sections covered over most of their length with previously applied insulation so as to form a sealed cavity bounded by the ends of the previously applied insulation, the field-joined bare ends of the pipe sections, and the larger conduit, wherein the cavity is filled with the insulating liquid to insulate the field-joined bare ends.

15. A fluid transport apparatus of claim 1 in which the isostatic pressure in the enclosed insulating liquid is all or only partially due to its own static head.

16. A fluid transport apparatus of claim 1 in which the insulating liquid comprises at viscous liquid including but not limited to heavy crude oil, fuel oil, synthetic hydrocarbons such as polybutene, polybutylene or polyisobutylene other plasticizers, liquid rosin, tall oil rosinate, fatty acids, castor oil, plant oil derivatives and esters, synthetic esters or silicone based liquids including silanes and siloxanes in which said viscous liquid may be mixed with each other or with less viscous liquids with very lower thermal conductivity to form a viscous composition that reduces convective and conductive heat flow.

17. A fluid transport apparatus of claim 1 in which the insulating liquid is a free flowing liquid with low thermal conductivity including fluorocarbons, refrigerants, light hydrocarbons such as ethane, butane, pentane, hexane and heptane in the divided space.

18. A fluid transport apparatus of claim 1 in which the insulating liquid is pumped or poured in to the space between the concentric conduits while they are being installed in the submerged or below grade environment or by displacing a substitute liquid after the concentric conduits are installed.

19. A fluid transport apparatus of claim 4 in which the pressure in said insulating liquid resists collapse of or leakage though the larger conduit that would tend to collapse the larger conduit if the liquid were absent.

20. A fluid transport apparatus of claim 4 in which the space between the fluid transport conduit and in which a plurality of supports separate the fluid transport conduit from the larger conduit and approximately fixes the position of one relative to the other.

\* \* \* \* \*